(12) United States Patent
Berntorp et al.

(10) Patent No.: US 10,370,004 B2
(45) Date of Patent: *Aug. 6, 2019

(54) SYSTEM AND METHOD FOR DETERMINING STATE OF STIFFNESS OF TIRES OF VEHICLE

(71) Applicant: Mitsubishi Electric Research Laboratories, Inc., Cambridge, MA (US)

(72) Inventors: Karl Berntorp, Watertown, MA (US); Stefano Di Cairano, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,636

(22) Filed: Apr. 2, 2018

(65) Prior Publication Data

US 2018/0222487 A1    Aug. 9, 2018

Related U.S. Application Data

(63) Continuation of application No. 15/209,027, filed on Jul. 13, 2016, now Pat. No. 10,011,284.

(51) Int. Cl.
*G06F 19/00* (2018.01)
*B60W 40/12* (2012.01)
(Continued)

(52) U.S. Cl.
CPC ............. *B60W 40/12* (2013.01); *B60T 8/171* (2013.01); *B60T 8/172* (2013.01);
(Continued)

(58) Field of Classification Search
CPC ............. B60W 40/12; B60W 2400/00; B60W 2720/26; B60T 8/171; B60T 8/172;
(Continued)

(56) References Cited

U.S. PATENT DOCUMENTS

| | | | | |
|---|---|---|---|---|
| 8,296,627 B2* | 10/2012 | Kim | ...................... | H03M 13/27 714/768 |
| 8,483,924 B2* | 7/2013 | Obuchi | .................. | B60W 40/11 701/72 |

(Continued)

*Primary Examiner* — Ronnie M Mancho
(74) *Attorney, Agent, or Firm* — Gennadiy Vinokur; James McAleenan; Hironori Tsukamoto

(57) ABSTRACT

A method jointly estimates a state of a vehicle including a velocity and a heading rate of the vehicle and a state of stiffness of tires of the vehicle including at least one parameter defining an interaction of at least one tire of the vehicle with a road on which the vehicle is traveling. The method uses the motion and measurement models that include a combination of deterministic component independent from the state of stiffness and probabilistic components dependent on the state of stiffness. The method represents the state of stiffness with a set of particles. Each particle includes a mean and a variance of the state of stiffness defining a feasible space of the parameters of the state of stiffness. The method updates iteratively the mean and the variance of at least some particles using a difference between an estimated state of stiffness estimated using the motion model of the vehicle including the state of stiffness with parameters sampled on the feasible space of the particle and the measured state of stiffness determined according to the measurement model using measurements of the state of the vehicle. The method outputs a mean and a variance of the state of stiffness determined as a function of the updated mean and the updated variance in at least one particle.

20 Claims, 24 Drawing Sheets

(51) Int. Cl.
*B60T 8/171* (2006.01)
*B60T 8/172* (2006.01)
(52) U.S. Cl.
CPC ....... *B60T 2210/12* (2013.01); *B60T 2240/00* (2013.01); *B60T 2240/04* (2013.01); *B60T 2270/86* (2013.01); *B60W 2400/00* (2013.01); *B60W 2720/26* (2013.01)
(58) Field of Classification Search
CPC ............ B60T 2210/12; B60T 2240/00; B60T 2240/04; B60T 2270/86
USPC ....................................................... 701/1, 70
See application file for complete search history.

(56) References Cited

U.S. PATENT DOCUMENTS

| | | | | |
|---|---|---|---|---|
| 2002/0109402 | A1* | 8/2002 | Nakamura | B60T 8/17552 303/146 |
| 2005/0225477 | A1* | 10/2005 | Cong | B60K 31/0008 342/70 |
| 2010/0057361 | A1* | 3/2010 | Caveney | B60W 30/08 701/301 |
| 2011/0066342 | A1* | 3/2011 | Ozaki | B60T 7/042 701/70 |

* cited by examiner

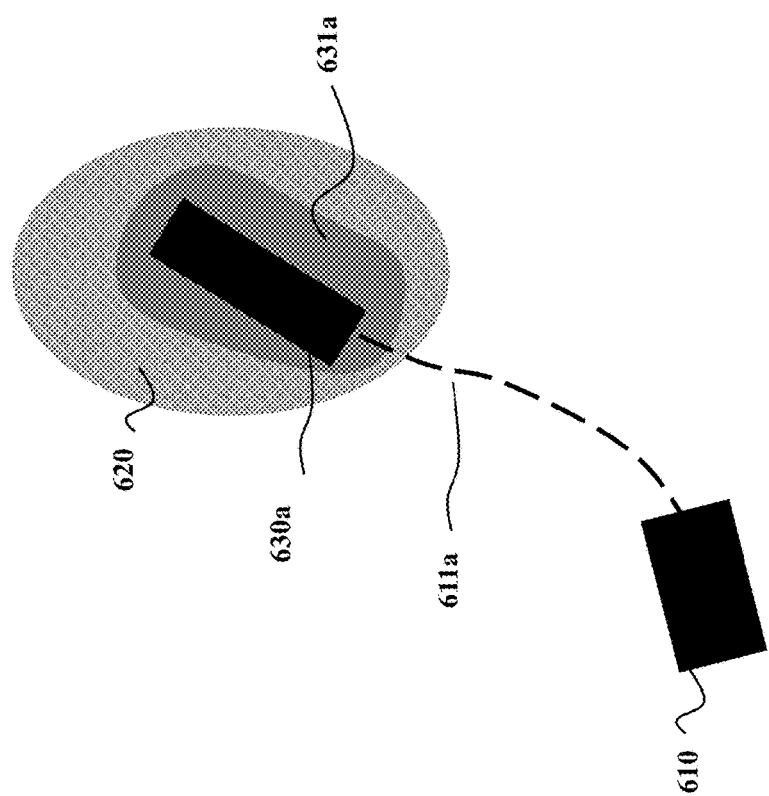

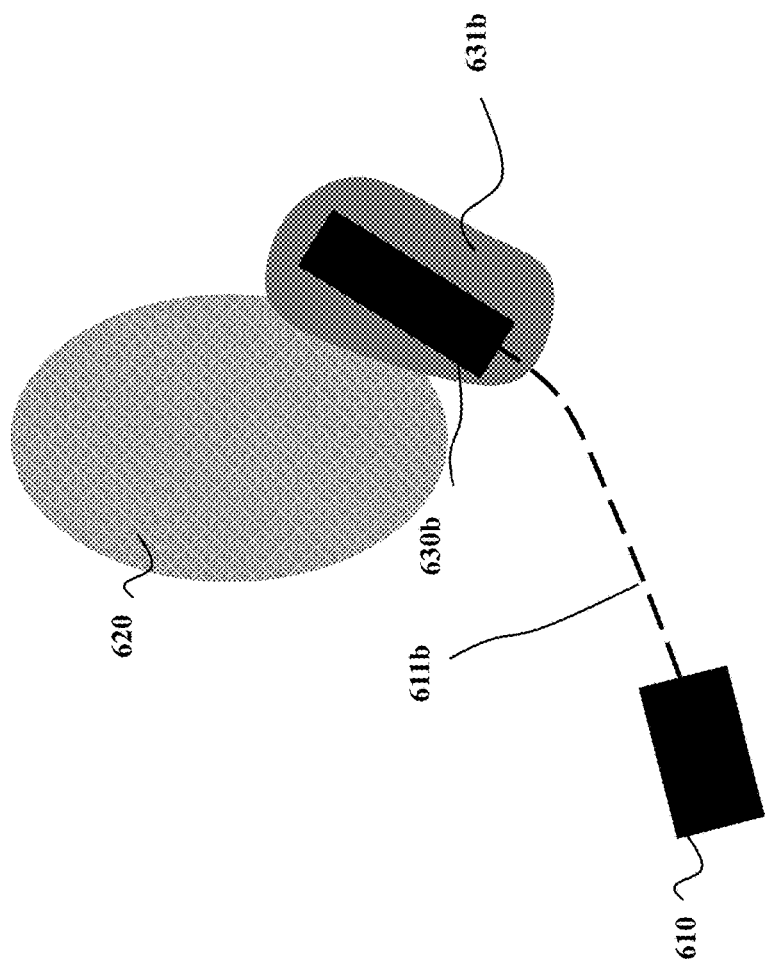

SYSTEM AND METHOD FOR DETERMINING STATE OF STIFFNESS OF TIRES OF VEHICLE

FIELD OF THE INVENTION

This invention relates to tire-to-road interaction of a vehicle, and more specifically to determining state of stiffness of tires of the vehicle and/or using the state of stiffness to control the movement of the vehicle.

BACKGROUND

The tire-to-road interaction is the dominating factor in generating, or changing, the motion of a wheeled vehicle, and the knowledge of variables related to the tire-to-road interaction is essential for many active safety systems in modern vehicles. Parameters related to the road friction are employed in many modern vehicles. For example, anti-lock braking systems (ABS), electronic stability control systems (ECS), and advanced driver-assistance systems (ADAS), all make extensible use of parameters related to the tire-to-road interaction, in order to provide advanced safety mechanisms.

Stiffness of a tire of the vehicle defines the extent to which the tire resists deformation in response to an applied force. A state of the stiffness of the tires is an important factor in understanding the tire-to-road interaction. To that end, the state of stiffness includes at least one parameter defining an interaction of at least one tire of the vehicle with a road on which the vehicle is traveling, but can include multiple parameters. For example, one parameter relating to the forces generated by the tire-to-road contact is the slip. In a longitudinal case, i.e., in the wheel's forward direction, the slip is defined in terms of the difference of the longitudinal velocity and the rotational speed of the wheel normalized by either the rotational speed of the wheel or the longitudinal velocity, whichever one is greater, i.e., whether the wheel is accelerating or braking. In a lateral case, i.e., in the wheel's lateral direction, the slip is defined in terms of a ratio between the wheel's lateral and longitudinal velocity components.

Another important parameter when determining the tire-to-road interaction is the friction coefficient. Knowledge of the friction coefficient can be used as a supervisory component to the driver, but it can also be utilized in, for example, ABS, ESC, and ADAS. Different tires have different characteristics, and precomputing the parameters can be good as a starting point, or as a nominal value. However, since the road conditions, tire pressure, different loading conditions, tire temperature, and wear on the tire, all affect the characteristics of the tire, precomputing the parameters, which determine the state of stiffness, can cause deficient performance of the above-mentioned active safety systems.

Thus, it is desirable to obtain knowledge about the friction and/or other parameters that can help determining the friction while driving. However, the friction is generally difficult to measure or sense directly during driving; hence, it is usually determined by using indirect friction determination methods, in combination with one or more sensors.

Another parameter of the state of the stiffness of the tires is an initial slope of the force-slip curve. The tire stiffness is in general different in the forward and lateral direction, so there are in general two individual force-slip curves per wheel, possibly depending on each other. The tire stiffness can be used directly in vehicle control systems, such as ADAS; can be used as a supervisory component to a driver, e.g., to alert the driver of abrupt changes in the road surface; can be used to classify the road surface on which the car is traveling; and/or it can be used to determine the friction coefficient.

A number of methods aim to estimate the stiffness of the tires using various optimization techniques. For example, the method described in U.S. Pat. No. 8,065,067 uses bins of collected data to approximate a nonlinear function and minimizing error of friction and tire stiffness using nonlinear optimization. However, the nonlinear optimization is known to be prone to lack of convergence or convergence in a local optimum.

Accordingly, there is a need for a system and a method for determining stiffness of tires of vehicle.

SUMMARY

It is an object of some embodiments of the invention to provide a system and a method for determining a state of stiffness of tires of a vehicle. It is another object of some embodiments to provide such a method that is suitable for determining the state of the stiffness in real time during the operation of the vehicle. As defined herein, the state of stiffness includes at least one parameter defining an interaction of at least one tire of the vehicle with a road on which the vehicle is traveling. For example, the state of stiffness can include one or combination of a longitudinal stiffness of the tire, a lateral stiffness of the tire, a friction between the tire and the road.

It is another object of some embodiments to determine the state of stiffness probabilistically and/or to estimate the confidence level of the determined stiffness. For example, one embodiment uses the confidence level of the state of the stiffness to classify the road surface on which the vehicle is traveling. As used herein, a vehicle can be any type of wheeled vehicle, such as a passenger car, bus, or rover.

Some embodiments of the invention are based on recognition that the motion of the vehicle is dependent on the state of stiffness of the tires. To that end, it is tempting to estimate the state of stiffness by simultaneously and iteratively estimating the state of the vehicle and the state of the stiffness. However, in order to estimate the state of the vehicle and the state of the stiffness iteratively over consecutive time instants, two motion models are needed, one of the motion of the state of the vehicle and one of the motion of the state of stiffness. The motion of the state of the vehicle is determined by the motion model of the vehicle. However, the time evolution of the state of stiffness is unknown, and any model of the motion of the state of stiffness is therefore unknown and cannot be verified.

Some embodiments are based on another recognition that the unknown state of stiffness can be regarded as stochastic disturbances acting on the, otherwise deterministic, model of the motion of the vehicle. The nature of the stochastic disturbance causes the vehicle to have different possible motions, and therefore different possible states. To that end, some embodiments are based on realization that the motion model of the vehicle includes a combination of a deterministic component of the motion and a probabilistic component of the motion. The deterministic component of the motion is independent from the state of stiffness and defines the motion of the vehicle as a function of time. On the other hand, the probabilistic component of the motion includes the state of stiffness having an uncertainty that acts as the disturbance on the motion of the vehicle. In such a manner, the motion of the vehicle can be modeled including the state of stiffness of the tires without knowing a model of the motion (time evolution) of the state of stiffness.

Some embodiments are based on another realization that the state of stiffness can be included into both a motion model of the vehicle and a measurement model of the state of the vehicle. For example, the measurement model of the vehicle can also be represented to include a combination of a deterministic component of the measurement independent from the state of stiffness and a probabilistic component of the measurement that includes the state of stiffness. Examples of measurements of the state of the vehicle that depend on the state of the stiffness include a longitudinal velocity, a lateral velocity, and a rotation rate of the vehicle. In some situations, such a state of the vehicle can be directly measured or can be determined by fusing the information from several sensors, including a longitudinal acceleration sensor, a lateral acceleration sensor, a rotation-rate sensor, a steering-wheel sensor, and wheel-speed sensors.

Accordingly, in some embodiments, it is acknowledged that the state of stiffness can be determined by deducing the state of stiffness from the relationship between the state of the vehicle, the state of stiffness, and the motion model of the state of the vehicle, and the relationship between the measurements of the state, the measurement model of the state of the vehicle, and the state of stiffness. In such a manner, the state of stiffness can be estimated without having a model of the motion of the state of stiffness, which is unknown.

To that end, some embodiments jointly estimate the state of a vehicle and a state of stiffness of tires of the vehicle to determine parameters that best describe the state of the vehicle given the measurements. For example, one embodiment represents the state of stiffness or the state of the vehicle with a set of particles. Each particle includes a state of the vehicle, which can be a measured state or the state determined during a previous iteration of the joint estimation. Additionally or alternatively, the particle includes a mean and variance of the state of stiffness defining a feasible space of the parameters of the state of stiffness. Representing the state of stiffness probabilistically, i.e., using the mean and the variance allows considering the stochastic disturbance on the motion of the vehicle. However, the mean and variance of the state of stiffness do not fit into the model of the vehicle. To that end, some embodiments sample the feasible space of the parameters of the state of stiffness defined by the mean and the variance and use the sampled parameter in the joint estimation. This embodiment is based on observation that the update of the mean and the variance of the state of the stiffness influence the value of the parameter of the state of stiffness used in the subsequent iteration, because such a parameter is drawn from the updated distribution.

Accordingly, one embodiment discloses a method for jointly estimating a state of a vehicle and a state of stiffness of tires of the vehicle, wherein the state of the vehicle includes a velocity and a heading rate of the vehicle, and wherein the state of stiffness includes at least one parameter defining an interaction of at least one tire of the vehicle with a road on which the vehicle is traveling. The method includes retrieving from a memory a motion model of the vehicle and a measurement model of the vehicle, wherein the motion model of the vehicle includes a combination of a deterministic component of the motion and a probabilistic component of the motion, wherein the deterministic component of the motion is independent from the state of stiffness and defines the motion of the vehicle as a function of time, wherein the probabilistic component of the motion includes the state of stiffness having an uncertainty and defines disturbance on the motion of the vehicle, wherein the measurement model of the vehicle includes a combination of a deterministic component of the measurement model independent from the state of stiffness and a probabilistic component of the measurement model that includes the state of stiffness; representing the state of stiffness with a set of particles, each particle includes a mean and a variance of the state of stiffness defining a feasible space of the parameters of the state of stiffness; updating iteratively the mean and the variance of at least some particles using a difference between an estimated state of stiffness estimated using the motion model of the vehicle including the state of stiffness with parameters sampled on the feasible space of the particle and the measured state of stiffness determined according to the measurement model using measurements of the state of the vehicle; and outputting a mean and a variance of the state of stiffness determined as a function of the updated mean and the updated variance in at least one particle. The steps of the method are performed using at least one processor operatively connected to the memory Another embodiment discloses a system for jointly estimating a state of a vehicle and a state of stiffness of tires of the vehicle, wherein the state of the vehicle includes a velocity and a heading rate of the vehicle, and wherein the state of stiffness includes at least one parameter defining an interaction of at least one tire of the vehicle with a road on which the vehicle is traveling, wherein the parameter of the state of stiffness includes one or combination of a longitudinal stiffness of the tire, a lateral stiffness of the tire, a friction between the tire and the road. The system includes a memory to store a motion model of the vehicle and a measurement model of the vehicle, wherein the motion model of the vehicle includes a combination of a deterministic component of the motion and a probabilistic component of the motion, wherein the deterministic component of the motion is independent from the state of stiffness and defines the motion of the vehicle as a function of time, wherein the probabilistic component of the motion includes the state of stiffness having an uncertainty and defines disturbance on the motion of the vehicle, wherein the measurement model of the vehicle includes a combination of a deterministic component of the measurement model independent from the state of stiffness and a probabilistic component of the measurement model that includes the state of stiffness; at least one sensor to determine measurements of the state of the vehicle; and a processor operatively connected to the memory and to the sensor. The processor is configured to represent the state of stiffness with a set of particles, each particle includes a mean and a variance of the state of stiffness defining a feasible space of the parameters of the state of stiffness; update iteratively the mean and the variance of at least some particles using a difference between an estimated state of stiffness estimated using the motion model of the vehicle including the state of stiffness with parameters sampled on the feasible space of the particle and the measured state of stiffness determined according to the measurement model using measurements of the state of the vehicle; and output a mean and a variance of the state of stiffness determined as a function of the updated mean and the updated variance in at least one particle.

Yet another embodiment discloses a non-transitory computer readable memory embodied thereon a program executable by a processor for performing a method for jointly estimating a state of a vehicle and a state of stiffness of tires of the vehicle, wherein the state of the vehicle includes a velocity and a heading rate of the vehicle, and wherein the state of stiffness includes at least one parameter defining an interaction of at least one tire of the vehicle with a road on which the vehicle is traveling. The method includes retrieving a motion model of the vehicle and a measurement model of the vehicle, wherein the motion model of the vehicle includes a combination of a deterministic component of the motion and a probabilistic component of the motion, wherein the deterministic component of the motion is independent from the state of stiffness and defines the motion of the vehicle as a function of time, wherein the probabilistic component of the motion includes the state of stiffness having an uncertainty and defines disturbance on the motion of the vehicle, wherein the measurement model of the vehicle includes a combination of a deterministic component of the measurement model independent from the state of stiffness and a probabilistic component of the measurement model that includes the state of stiffness; representing the state of stiffness with a set of particles, each particle includes a mean and a variance of the state of stiffness defining a feasible space of the parameters of the state of stiffness; updating iteratively the mean and the variance of at least some particles using a difference between an estimated state of stiffness estimated using the motion model of the vehicle including the state of stiffness with parameters sampled on the feasible space of the particle and the measured state of stiffness determined according to the measurement model using measurements of the state of the vehicle; and outputting a mean and a variance of the state of stiffness determined as a function of the updated mean and the updated variance in at least one particle.

BRIEF DESCRIPTION OF THE DRAWINGS

FIG. 6A is an illustration of assigning probabilities to a particle according to some embodiments of the invention;

FIG. 6B is an illustration of assigning probabilities to a particle according to some embodiments of the invention;

DETAILED DESCRIPTION

Figure 1A:
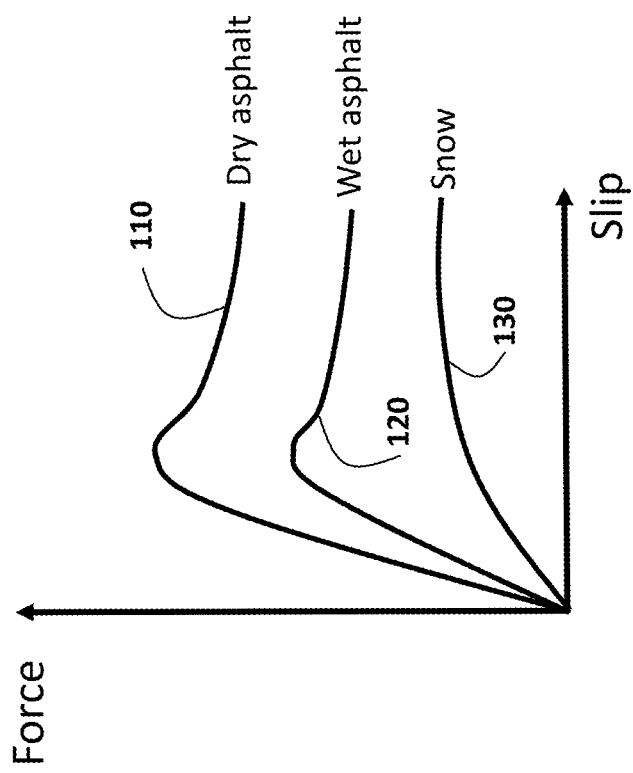
FIG. 1A is an illustration of how the magnitude of the force on a tire of vehicle traveled on a road varies with the slip for different types of the surface of the road.

FIG. 1A shows an illustration of how the magnitude of the force on a tire of vehicle traveled on a road varies with the slip for different types of the surface of the road such as dry asphalt 110, wet asphalt 120, and snow 130 surfaces. The tire-force relationship is highly nonlinear and also depends on other quantities, such as tire pressure, vehicle mass, tire temperature, and wear on the tire. As used herein, a vehicle can be any type of wheeled vehicle, such as a passenger car, bus, or rover.

FIG. 1A shows an exemplar situation when all other quantities except the slip are kept fixed. This is a per se method of illustrating the tire-force relationship. FIG. 1A can illustrate the longitudinal force, in which case the slip is defined in terms of the difference of the longitudinal velocity and the rotational speed of the wheel normalized by either the rotational speed of the wheel or the longitudinal velocity, whichever one is greater. FIG. 1A can illustrate the lateral force, in which case the slip is defined in terms of a ratio between the wheel's lateral and longitudinal velocity components.

Figure 1B:
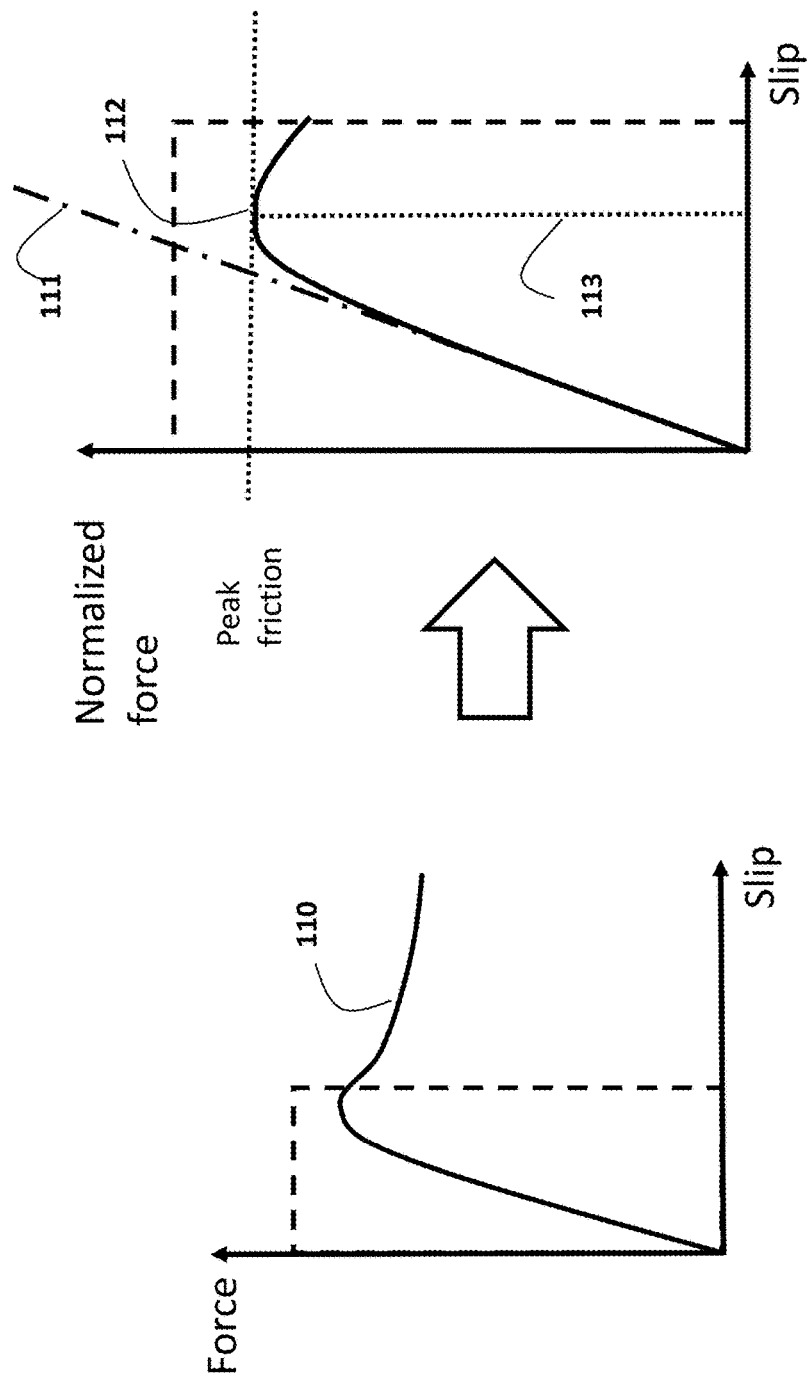
FIG. 1B is a zoomed-in version of FIG. 1A.

FIG. 1B shows a zoomed-in version of FIG. 1A, where the force has been normalized with the normal force resting on the wheel, where the case of dry asphalt 110 is considered in more detail. The value where the force attains its maximum is called the peak friction 112. The peak friction 112 is useful to know in several automotive control systems. For example, the knowledge of peak friction is important in order to know how much brake torque that can be applied to a particular wheel in ESCs. The peak friction value and the corresponding slip value 113 can be used in anti-lock braking systems (ABS) to achieve optimal braking force. The initial slope 111 of the force curve 110 is usually called the stiffness of the tire. During normal driving, in which case the slip is small, the force curve can be approximated with the tire stiffness 111.

The stiffness 111 is useful in vehicle control, for example, in ESC and active front steering (AFS) systems. However, the stiffness 111 can define multiple parameters. For example, the stiffness 111 can also be used to determine the peak friction 112, since the tire stiffness is dependent on the peak friction, and vice versa. For example, from FIG. 1A, by comparing the force curves for dry asphalt 110, wet asphalt 120, and snow 130, it is clear that the peak friction value is large whenever the tire stiffness value is large. To that end, some embodiments of the invention determine a state of stiffness of tires of the vehicle, wherein the state of stiffness includes at least one parameter defining an interaction of at least one tire of the vehicle with a road on which the vehicle is traveling. Examples of the parameter of the state of stiffness includes one or combination of a longitudinal stiffness of the tire, a lateral stiffness of the tire, a friction between the tire and the road.

Some embodiments are based on realization that the state of stiffness can be included into both a motion model of the vehicle and a measurement model of the state of the vehicle. To that end, some embodiments jointly estimate the state of a vehicle and a state of stiffness of tires of the vehicle to determine parameters that best describe the state of the vehicle given the measurements.

Figure 1C:
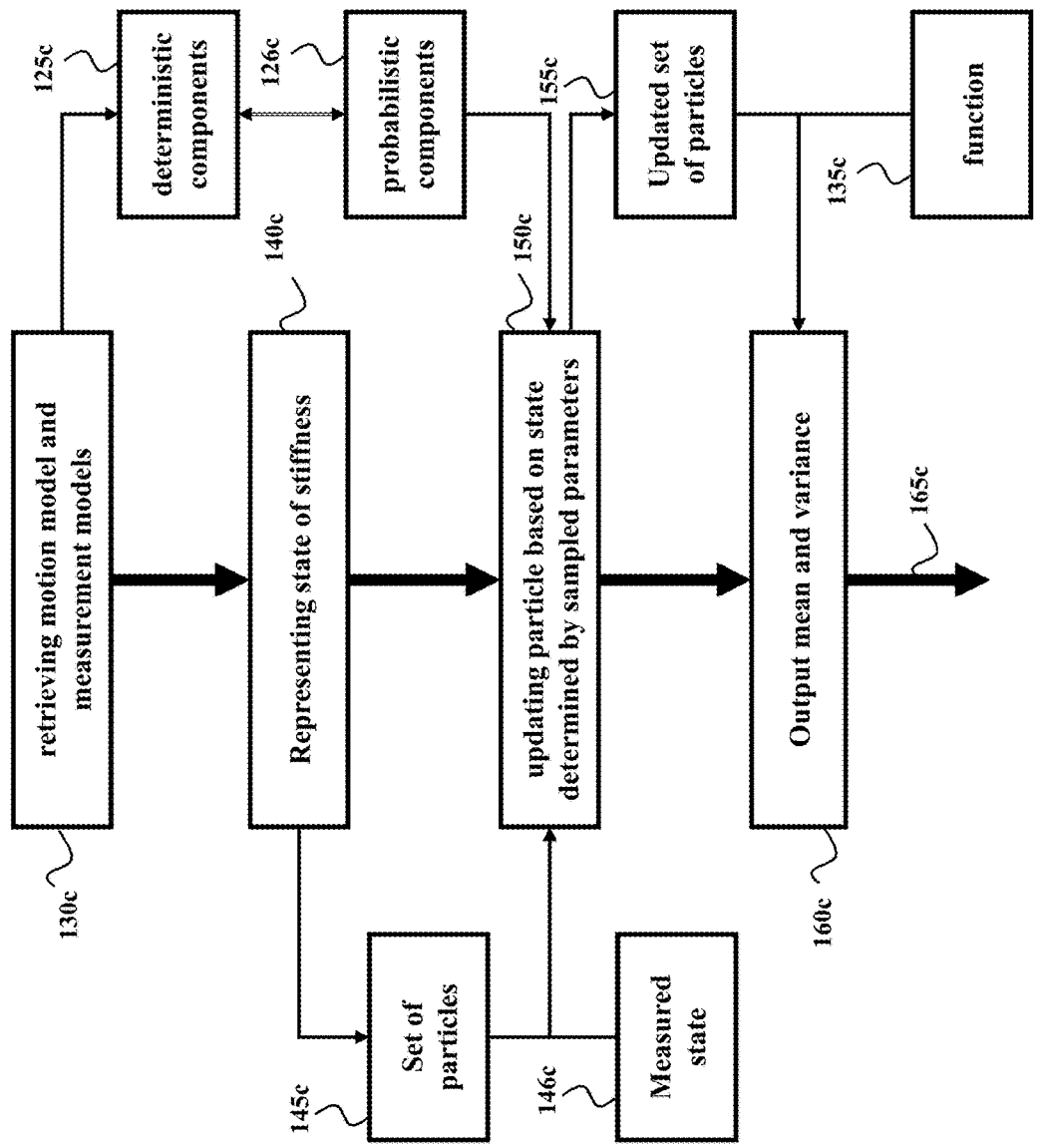
FIG. 1C is a flowchart of a method for jointly estimating a state of a vehicle and a state of stiffness of tires of the vehicle according to one embodiment of the invention.

FIG. 1C shows a flowchart of a method for jointly estimating a state of a vehicle, e.g., a velocity and a heading rate of the vehicle, and a state of stiffness of tires of the vehicle according to one embodiment of the invention. This embodiment is based on recognition that the unknown tire parameters can be regarded as stochastic disturbances acting on a, otherwise deterministic, model of a motion of the vehicle. The nature of the stochastic disturbance causes the vehicle to have different possible motions, and therefore different possible states.

To that end, some embodiments retrieve 130c from a memory a motion model of the vehicle and a measurement model of the vehicle having deterministic 125c and probabilistic 126c components. For example, the motion model of the vehicle includes a combination of a deterministic component of the motion and a probabilistic component of the motion, wherein the deterministic component of the motion is independent from the state of stiffness and defines the motion of the vehicle as a function of time, and wherein the probabilistic component of the motion includes the state of stiffness having an uncertainty and defines disturbance on the motion of the vehicle. Similarly, the measurement model of the vehicle includes a combination of a deterministic component of the measurement independent from the state of stiffness and a probabilistic component of the measurement that includes the state of stiffness.

The embodiment represents the state of stiffness 140c and the state of the vehicle with a set of particles 145c. Each particle includes a state of the vehicle, which can be a measured state or the state determined during a previous iteration of the joint estimation. Additionally or alternatively, the particle includes a mean and variance of the state of stiffness defining a feasible space of the parameters of the state of stiffness. Representing the state of stiffness probabilistically, i.e., using the mean and the variance allows considering the stochastic disturbance on the motion of the vehicle. However, the mean and variance of the state of stiffness do not fit into the model of the vehicle. To that end, the embodiment samples the feasible space of the parameters of the state of stiffness defined by the mean and the variance and use the sampled parameter in the joint estimation.

Figure 1D:
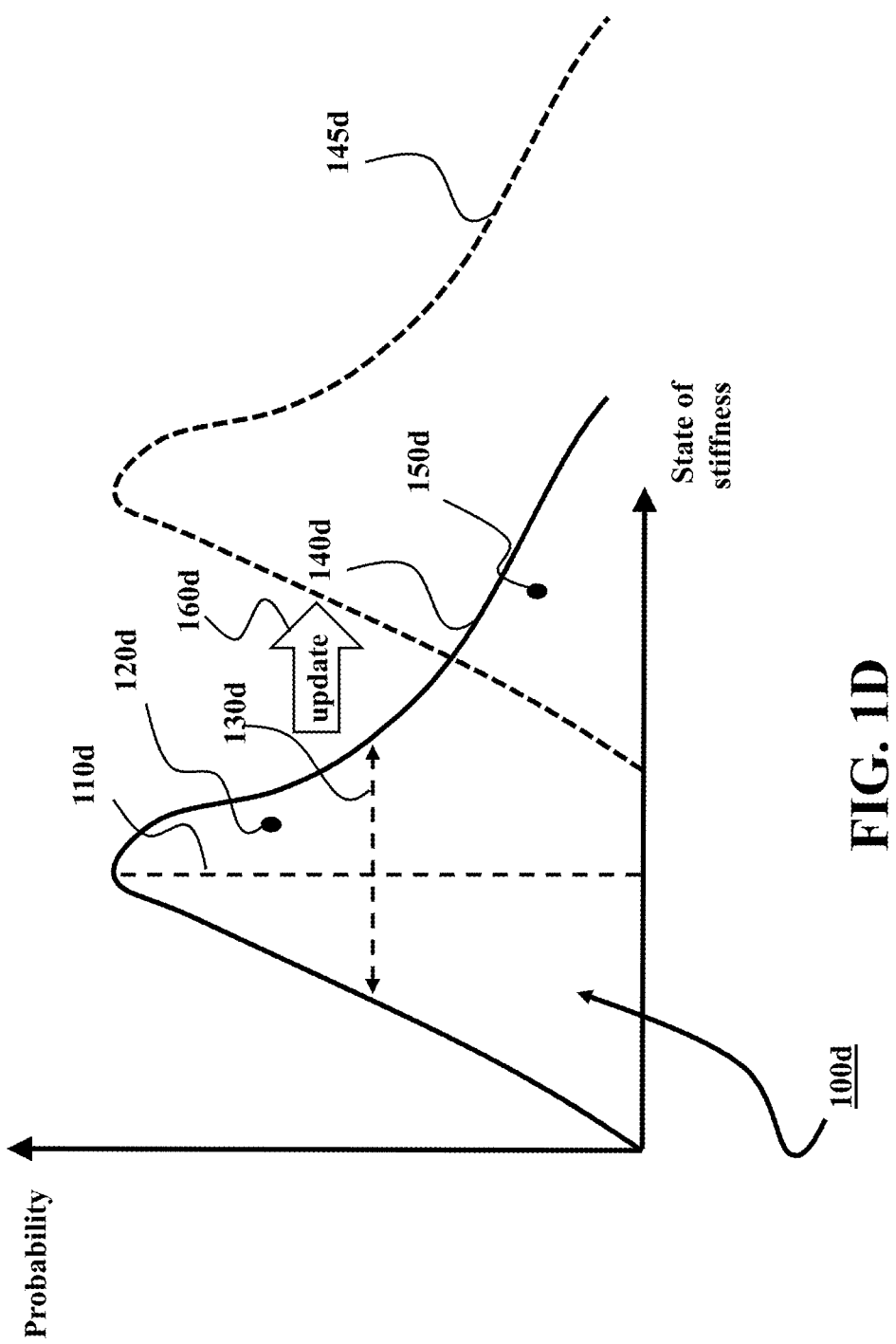
FIG. 1D is a graph illustrating probability distribution function defining the feasible space of the state of stiffness according to one embodiment of the invention.

FIG. 1D shows a graph illustrating probability distribution function 140d defining the feasible space 100d of the state of stiffness. The shape of the function 140d can be determined in advance. For example, if the distribution of the state of stiffness is Gaussian, the shape of the distribution 140d is the "Gaussian hat" shape. If the shape is fixed, the mean 110d and the variance 130d define the distribution 140d and the feasible space 100d from which the sample parameter of the state of stiffness can be drawn.

As used herein, sampling the parameter of the state of stiffness is drawing the parameter with probabilities defined by the distribution 140d, which is in turn defined by the mean and the variance of the state of stiffness. For example, according to the distribution 140d, the probability of a sample 120d to be drawn or sampled is higher than the probability of the sample 150d. Such a representation allows updating 160d the mean and the variance of the state of stiffness to produce an updated distribution 145d defining updated feasible space for sampling state of stiffness. This embodiment is based on observation that the update of the mean and the variance of the state of the stiffness influence the value of the parameter of the state of stiffness used in the subsequent iteration, because such a parameter is drawn from the updated distribution.

To that end, the method updates 150c at least one of the particles, including the mean and variance of the state of stiffness to produce the updated set 155c. For example, the embodiment updates iteratively the mean and the variance of at least some particles using a difference between an estimated state of stiffness estimated using the motion model of the vehicle including the state of stiffness with parameters sampled on the feasible space of the particle and the measured state of stiffness determined according to the measurement model using measurements 146c of the state of the vehicle.

Next, the method outputs 160c a mean and a variance of the state of stiffness 165c determined as a function 135c of the updated mean and the updated variance in at least one particle. Example of the function 135c include an average, e.g., a weighted average of the means and the variances of the particles in the set and a maximal function selecting the mean and the variance of the particle with the largest probability of representing the measured state 146c.

For example, in one implementation, the method determines a probability distribution of the state of the vehicle and the state of the stiffness using a probability distribution of the measurement model centered on the measured state. The probability distribution of the measurement model can be determined in advance, e.g., using the values of variance of state of stiffness determined during previous time instants. Next, the method determines the probability of each particle to represent the true state of the stiffness according to a placement of the mean in the particle on the probability distribution of the state of the vehicle and the state of the stiffness. Such a probability is used by the function 135c in determining the output 165.

Figure 1E:
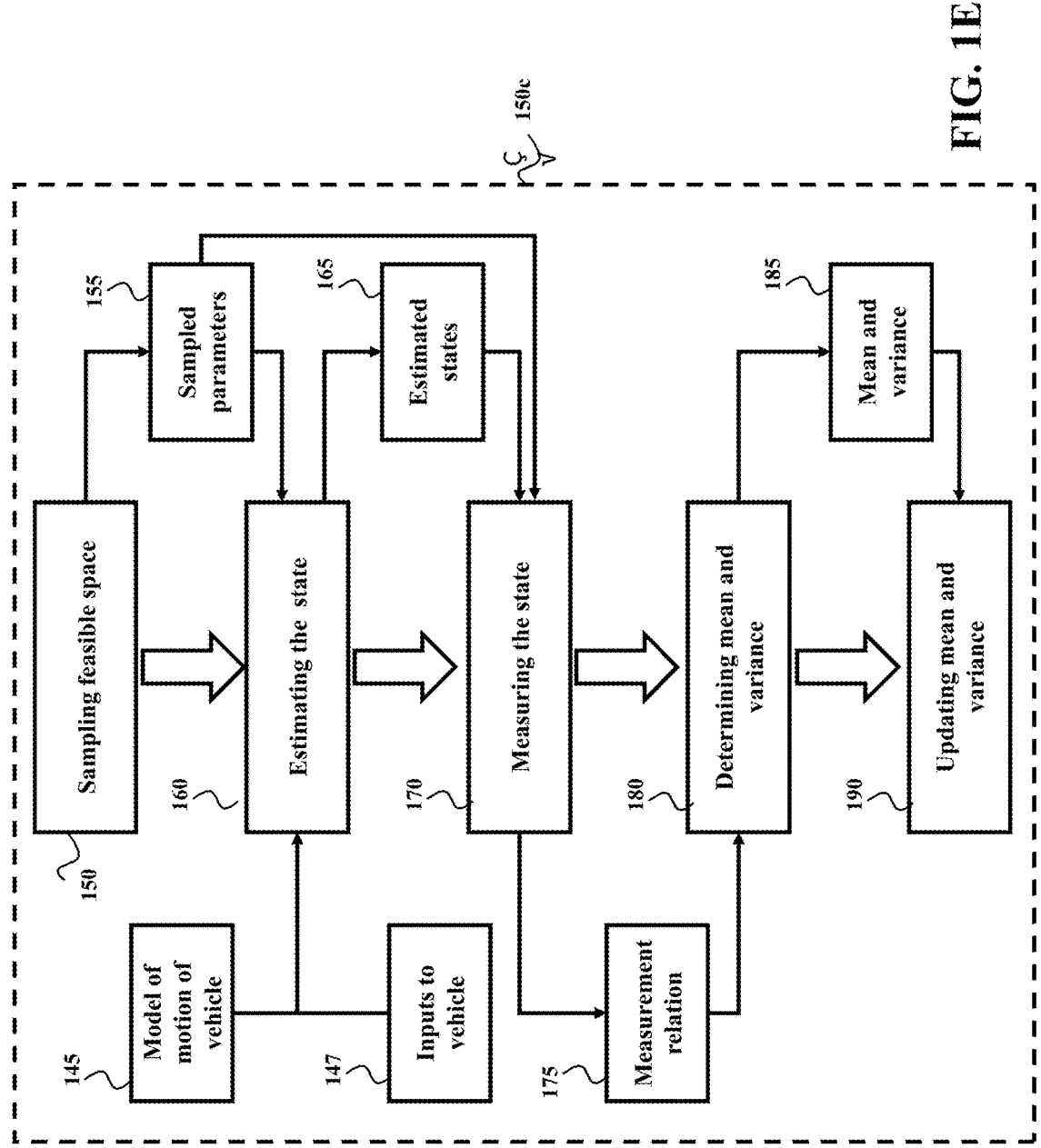
FIG. 1E is a block diagram of one iteration of a method for updating the particle according to one embodiment that updates the particles iteratively.

FIG. 1E shows a block diagram of one iteration of a method for updating the particle 150c according to one embodiment that updates the particles iteratively, e.g., recursively. The method can be implemented using a processor of the vehicle. The method samples 150 a feasible space of possible parameters to be used in a model of the motion of the vehicle to produce a set of sampled parameters 155. The model 145 of the motion of the vehicle includes an uncertainty on the motion of the vehicle due to the uncertainty in the state of stiffness. The method estimates 160, using the model 145 of the motion of the vehicle and inputs 147 to the vehicle, a possible state 165 arising due to each sampled parameter that affects the motion of the vehicle.

Next, the method measures the state 170. For example, the method measures such a state of the vehicle that depends on the state of the stiffness. The method maps the measurements to a model of the measurement relating the state of the vehicle and the state of stiffness, to produce a relation 175 between the measurement, the state of the vehicle, and the state of stiffness. The method determines 180 the mean of the state of stiffness for each particle that results in the measured state of the vehicle according to the measurement model 175. The method also determines 180 the variance of the measured state of stiffness as a combination of an uncertainty of the measurements and the variance of the state of stiffness in the particle, wherein parts of the uncertainty of the measurements can be determined a priori. The determined 185 mean and variance of the state of stiffness are used 190 to updating the mean of the state of stiffness in the particle using the mean of the measured state of stiffness resulting in the measured state of the vehicle. Similarly, the method updates 190 the variance of the state of stiffness in the particle using the variance of the measured state of stiffness.

Figure 2A:
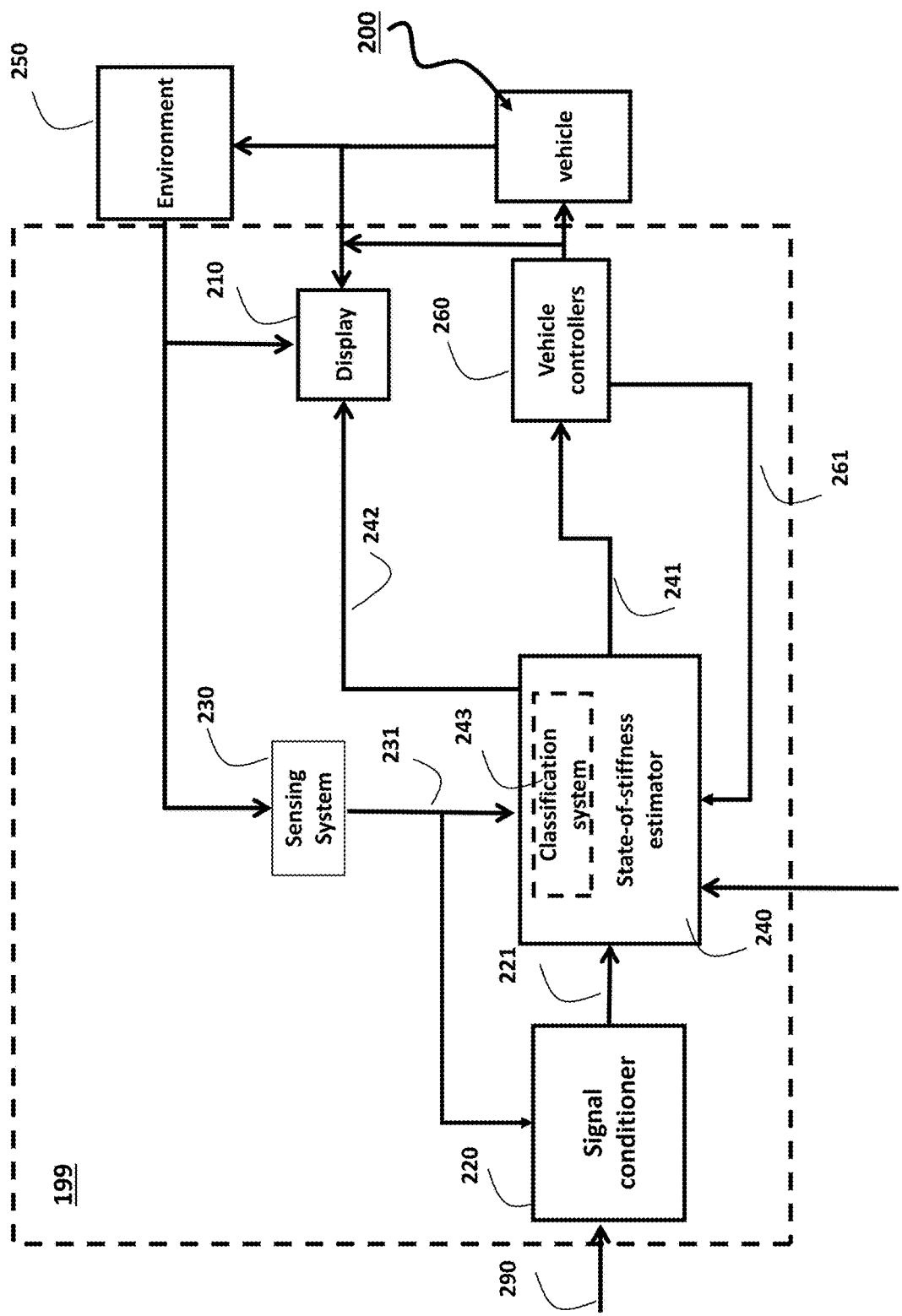
FIG. 2A is a schematic of a general control system for controlling a vehicle.

FIG. 2A illustrates a general block diagram of a control system 199 for controlling a vehicle 200. Different component of the control system 199 can be implemented using one or several processors operatively connected to a memory and/or various types of sensors of the vehicle. As used herein, a vehicle can mean any wheeled vehicle, including a passenger car, a bus, or a mobile robot. The vehicle can be an autonomous vehicle, semi-autonomous vehicle, or a standard vehicle equipped with active safety systems such as electronic stability control (ESC) and/or ABS. The control system 199 can be internal to the vehicle 200 and the implementation of the different components of the control system 199 can depend on the type of the vehicle. For example, depending on the type of the vehicle, the components of the vehicle 260 can vary.

The control system 199 receives information 290 and produces estimates of the wheel speed for some or all wheels 221. The information 290 can include wheel-speed measurements from ABS, engine torque and rotation speed, and/or brake pressure. The control system 199 can also include a sensing system 230 that measures inertial components of the vehicle, such as rotation rate of the vehicle and acceleration of the vehicle, using an inertial measurement unit (IMU). For example, the IMU can comprise 3-axis accelerometer(s), 3-axis gyroscope(s), and/or magnetometer(s). The IMU can provide velocity, orientation, and/or other position related information to other components of the control system 199. The sensing system 230 can also receive global position information from a global positioning system (GPS) or equivalent.

The control system 199 also includes a state-of-stiffness estimator 240 for determining parameters of the state of the stiffness. In some embodiments of the invention, the state-of-stiffness estimator iteratively determines the state of the vehicle and the state of stiffness, from a state of the vehicle and a state of stiffness determined during previous iterations. As used herein, a state of the vehicle includes velocity and heading rate of the vehicle, but can also include a position, heading, and additional quantities related to the motion of the vehicle.

The state-of-stiffness estimator 240 can also include a classification system 243 for classifying the surface on which the vehicle is traveling, based on the state of stiffness. For example, the state-of-stiffness estimator 240 can determine the mean and the variance of the state of stiffness. Depending on the variance, the classification system can classify the road surface as, e.g., dry asphalt, wet asphalt, snow, or ice.

The state-of-stiffness estimator 240 uses information 231 from the sensing system and wheel-speed estimates 221 from the signal conditioner. If the sensing system 230 is equipped with an IMU for measuring the longitudinal acceleration of the vehicle, the measurements from the IMU can be used to determine parameters related to the longitudinal friction of the tire. However, if the sensing system 230 does not possess information about longitudinal acceleration, the signal conditioner 220 can output an estimate 221 of the longitudinal acceleration based on the wheel-speed estimates and other quantities according to other embodiments. Additionally or alternatively, the state-of-stiffness estimator 240 can determine an estimate of the longitudinal acceleration based on the wheel-speed information 221. In one embodiment of the invention, the states of the vehicle and parameters determining the tire to road interaction are estimated iteratively by combining wheel-speed and IMU information. In another embodiment of the invention, the friction-estimation system only includes lateral components. In such a case, the information 221 can include necessary information for the longitudinal motion. The state-of-stiffness estimator 240 can also receive information 261 about the vehicle motion from the vehicle-control units 260. The information can include a state of the vehicle, such as position, heading, velocity, and is received either from hardware or software, connected directly or remotely to the machine.

For example, the state-of-stiffness estimator can output state of stiffness 241 including friction values, tire-stiffness values, certainty levels of the tire stiffness, or combinations thereof. The control system 199 also includes vehicle controllers 260 that use the state of stiffness 241. For example, in one embodiment, the state of stiffness is used in an advanced driver-assistance system (ADAS) that utilizes a model of the dynamics of the vehicle, which depends on the state of stiffness. The vehicle controllers 260 can include stand-alone components, such as ABS, ESC, or ADAS, or a combination of vehicle controllers that enable autonomous driving features. For example, the state-of-stiffness estimator can output state of stiffness 242 to be displayed on a display 210 of the vehicle as supervisory components to a driver of the vehicle.

Figure 2B:
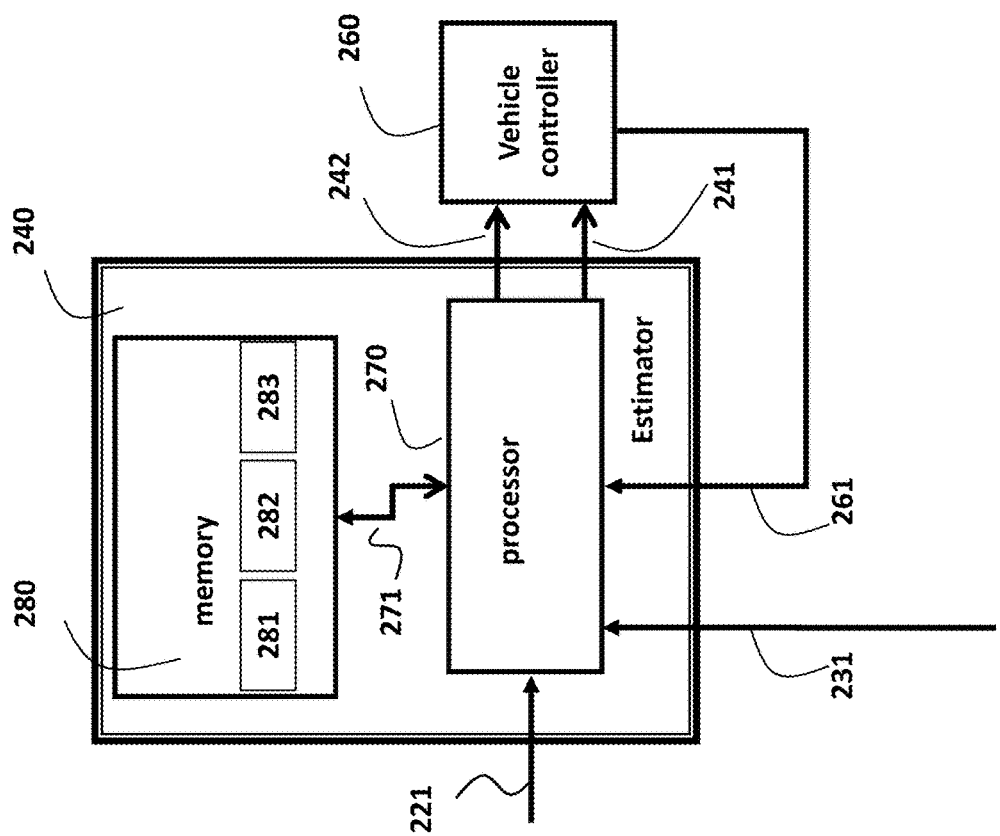
FIG. 2B is a diagram of a general structure of a system according to one embodiment of the invention.

FIG. 2B shows a general structure of the state-of-stiffness estimator 240 according to one embodiment of the invention. The state-of-stiffness estimator 240 includes at least one processor 270 for executing modules of the state-of-stiffness estimator 240. The processor 270 is connected 271 to a memory 280 that stores the statistics 281 of the states and parameters and the vehicle information 282. The memory 280 also stores 283 the internal information of the estimator, including, but not limited to, values of the state of stiffness, values of each computed state of the vehicle, and the motion leading up to each state of the vehicle. In some embodiments, the information on the vehicle is updated 271 based on information received from the vehicle 261 and the sensing 231.

Figure 2C:
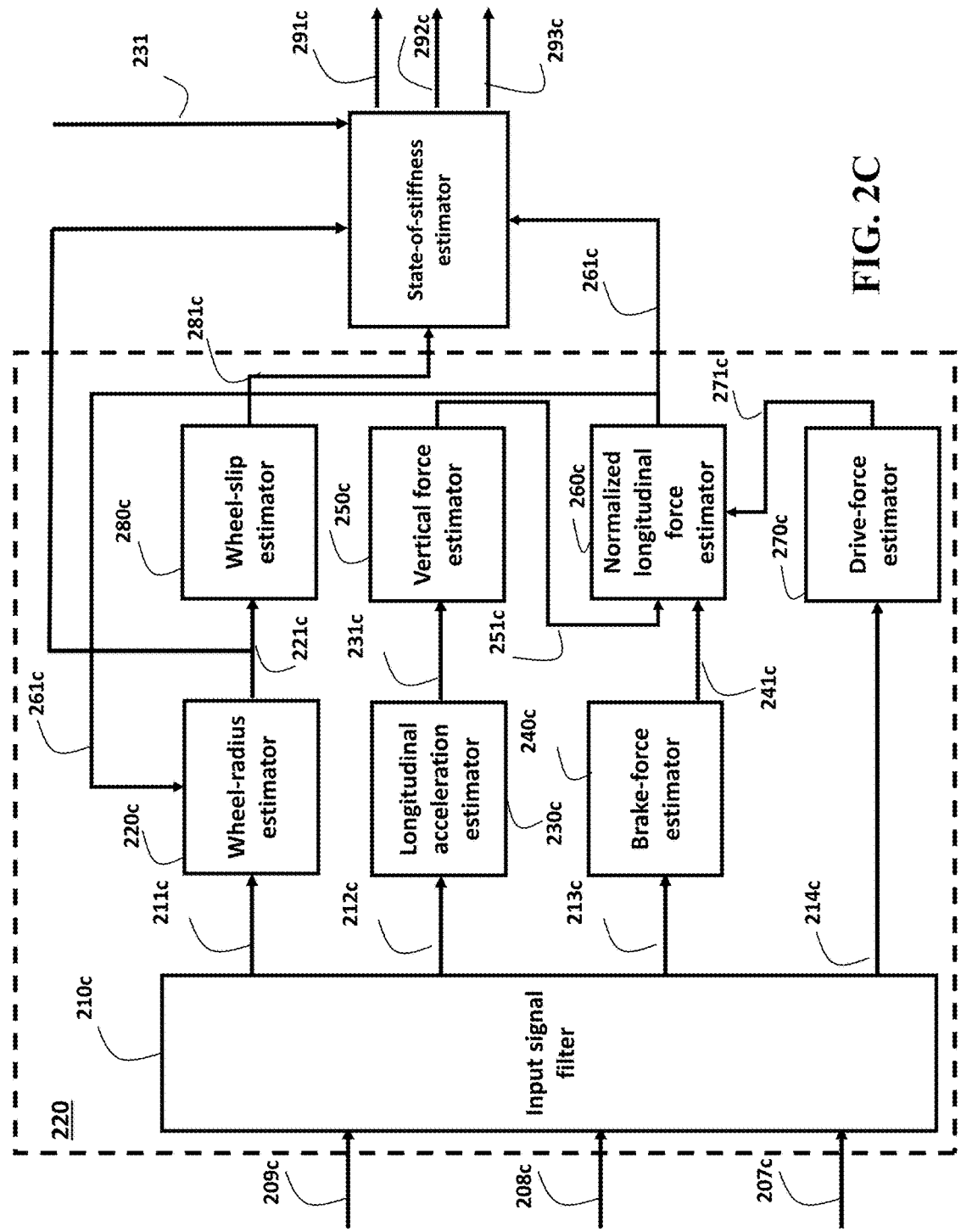
FIG. 2C is a block diagram of a method for determining or estimating the internal signals from the vehicle according to one embodiment.

FIG. 2C shows a block diagram of a method for determining or estimating the internal signals from the vehicle according to one embodiment. The steps leading up to 281$c$ and 261$c$ can be implemented into a control unit or circuit arrangement, which can be used in systems such as ABS, ESP, ADAS, or in autonomous vehicles. For example, input signal filter 210$c$ can determine the input signals by processing rotational rate of the wheels or tires 209$c$ to produce a signal 211$c$, whereby the rotational rates can be determined for each individual wheel or tire of the vehicle. The filter 210$c$ can also determine the input signal 212$c$ by processing the brake pressure 208c and determine the input signal 213c by processing the rotational rate and torque from the engine 207c. The block 230c determines the longitudinal acceleration 231c, while a brake-force estimator 240c estimates the braking force 241c for each wheel using the applied brake pressures 213c. From the values of the engine torques and rotation rate 214c of the engine, a module in the control unit estimates the driving force in the longitudinal direction, while the vertical force 251c is estimated in 250c, for example using estimates of the longitudinal acceleration 231c. Using the vertical force estimates 251c and the longitudinal force estimates 241c and 271c, the normalized longitudinal force 261c can be determined. A wheel-radius estimator 220c uses the processed rotational rates 211c of the tires or wheels and the estimate of the normalized driving force 261c to correct the wheel radius and outputs the wheel radius with the rotation rates 221c. For example, the wheel-radius estimator 220c estimates the wheel-slip 221c. Thus, the signal conditioner 220 can provide the state-of-stiffness estimator 240 with estimates of the longitudinal velocity 221c, wheel-slip estimates 281c, or normalized longitudinal force 261c, or a combination thereof.

Accordingly, in some embodiments, the state-of-stiffness estimator 240 uses the estimates of one or combination of the longitudinal velocity 221c, wheel-slip estimates 281c, and normalized longitudinal force 261c. Additionally or alternatively, a sensing system 230 provide to the state-of-stiffness estimator 240 measurements of lateral acceleration and heading rate 231, to estimate state of stiffness including lateral tire-stiffness parameters 291c, lateral friction coefficients 292c, and/or to classify the road surface 293c.

In addition, some other embodiments use the rotation rates 221c and a sensing system 230 providing measurements of longitudinal and lateral acceleration and heading rate 231 to estimate the state of stiffness including longitudinal and lateral tire-stiffness parameters 291c, longitudinal and lateral friction coefficients 292c, and to classify the road surface 293c. It is to be understood that the raw wheel rotation rates 209c can be used in replacement of 221c, whenever 221c cannot be obtained or in a case when the method 220 is of less complicated nature.

Some embodiments of the invention rely on the realization that the state of stiffness can be determined by jointly and iteratively estimating the state of the vehicle and the state of stiffness that best describe the state of the vehicle in a probabilistic framework, instead of trying to find the parameters associated to the tire by relying on tedious optimization algorithms. That is, the state of stiffness can be estimated by considering the probability that a certain tire-stiffness value explains the state estimate, determined during previous iterations.

For example, some embodiments use a probabilistic motion model of the vehicle, wherein the stiffness parameters are expressed as stochastic disturbances on the motion of the vehicle, wherein the selection of the set of parameters can be determined according to optimizing some probabilistic cost function. The cost functions are selected according to other embodiments of the invention.

Figure 3:
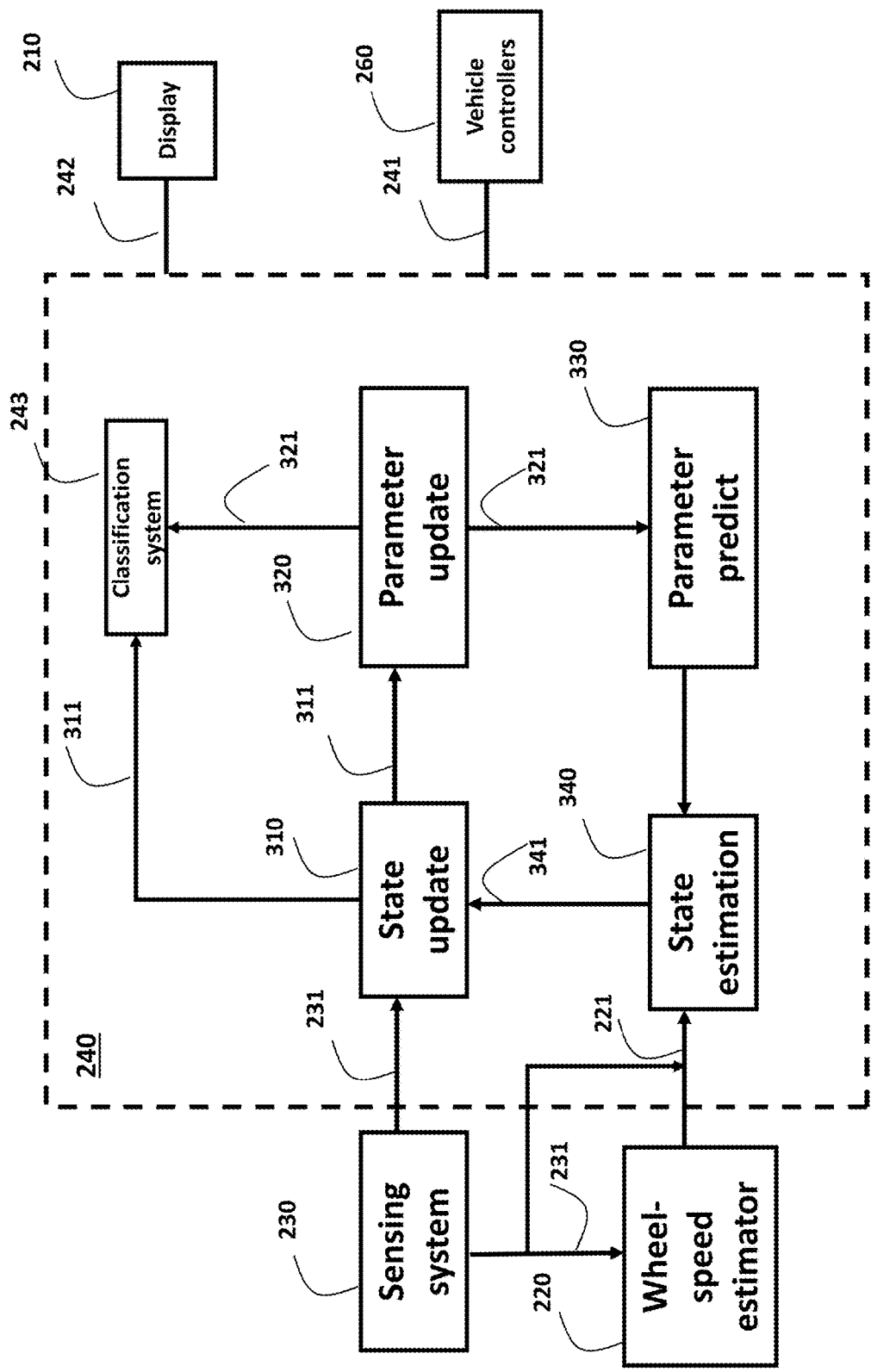
FIG. 3 is a schematic of the state-of-stiffness estimator according to some embodiments of the invention.

FIG. 3 shows a schematic of the state-of-stiffness estimator 240 according to some embodiments of the invention. The estimator 240 uses wheel-speed measurements 221, or their estimates, to estimate 340 future states 341 of the vehicle. In some embodiments, the state estimation 340 uses a model of the motion (dynamics) of the vehicle, wherein the model depends on the state of stiffness. The model can include both longitudinal and lateral dynamics, in which case both longitudinal and lateral tire parameters are included in the state of stiffness. Alternatively, the model can include only one of the longitudinal and lateral dynamics. The state update module 310 uses measurements 231 from a sensing system 230 to correct the state estimation 341 to form an updated 311 state of the vehicle.

In one embodiment, the updated state 311 and/or the estimation 341 is used as the input 241 to a vehicle-control system 260. Additionally or alternatively, in another embodiment, the state estimate 311 is used to update 320 at least one parameter of the state of stiffness, resulting in updated state of stiffness 321 of the vehicle. In one embodiment, the updated state of stiffness 321 is used as inputs 241 to a vehicle-control system 260. Additionally or alternatively, in another embodiment, the updated state of stiffness 321 is used as inputs 242 to the display 210 to serve as a supervisory component to the driver. Additionally or alternatively, in another embodiment, the updated state of stiffness 321 is used to update 330 the model of the motion of the vehicle for estimating the state 340, thus concluding one iteration of some embodiments of the invention.

Figure 4:
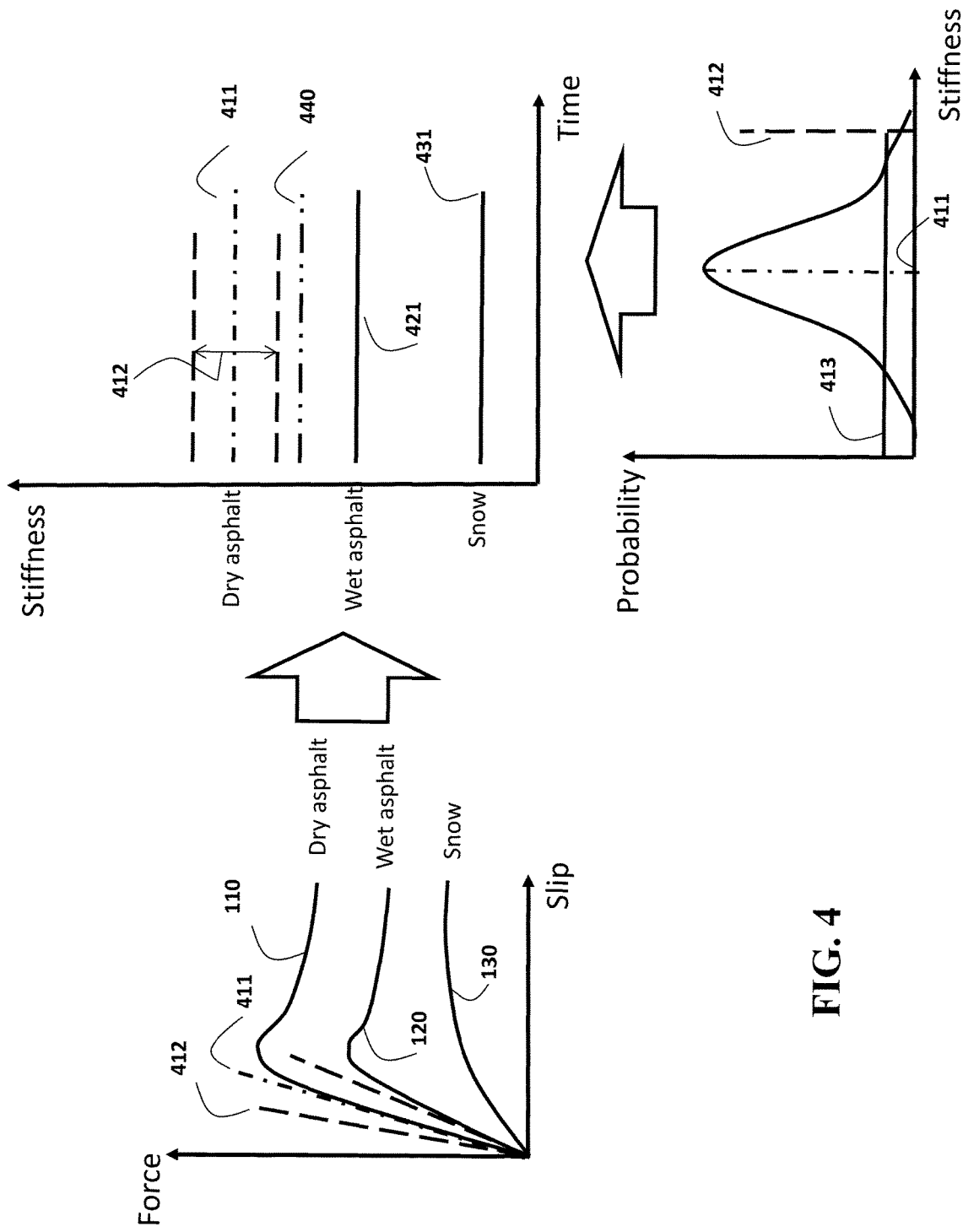
FIG. 4 is a graph illustrating the classification of surface according to one embodiment.

FIG. 4 shows a graph illustrating the classification of surface according to one embodiment, in which the state-of-stiffness estimator includes a classification system 243. The updated state of stiffness 321 is used to classify the road surface and determine the actual friction coefficient of the road. FIG. 4 shows a situation where the parameter estimator identifies the state of stiffness to have a mean 411 and the variance 412. The stiffness estimate 411 is uncertain, but the uncertainty is smaller than some predefined threshold 440, so the stiffness value can with some predefined probability value be claimed to categorize the road surface as dry asphalt. The threshold can be defined as the value of 99% certainty, 99.5% certainty, or some other value. The threshold can also be made adaptive. For example, if the estimated state of the vehicle 311 is also provided to the classification system 243, the threshold can be chosen to depend on the velocity.

To that end, some embodiments classify the surface of the road using the outputted mean and variance of the state of stiffness. For example, one embodiment determines a type of the surface based on a value of the mean of the state of stiffness unless the variance of the state of stiffness covers a value corresponding to a different type of the surface, such as wet asphalt 421 or the surface covered with snow 431. Using the FIG. 4 as an example, the embodiment classifies the type of the surface as the dry asphalt unless the variance of the state of stiffness allows classifying the surface as wet asphalt even with the low probability. Additionally or alternatively, one embodiment determines a type of the surface based on a value of the mean of the state of stiffness and just determines a probability of the surface to have the type based on the variance of the state of stiffness. Using the FIG. 4 as an example, the embodiment classifies the type of the surface as the dry asphalt with a probability determined by the difference between one and 413. For example, if 412 is chosen as three standard deviations from 411, where in the standard deviation is the square root of the variance, the embodiment classifies the type of surface as the dry asphalt with a probability approximately equal to 0.997.

Some embodiments treat the unknown state of stiffness as stochastic disturbances acting on the, otherwise deterministic, model of the motion of the vehicle. The nature of the stochastic disturbance causes the vehicle to have different possible motions, and therefore different possible states. To that end, some embodiments are based on realization that the motion model of the vehicle includes a combination of a deterministic component of the motion and a probabilistic component of the motion. The deterministic component of the motion is independent from the state of stiffness and defines the motion of the vehicle as a function of time. On the other hand, the probabilistic component of the motion includes the state of stiffness having an uncertainty that acts as the disturbance on the motion of the vehicle. In such a manner, the motion of the vehicle can be modeled including the state of stiffness of the tires without knowing a model of the motion (time evolution) of the state of stiffness.

In some embodiments, the state of the vehicle evolves dynamically in time according to a model of the motion of the state of the vehicle. If choosing the model of the motion of the vehicle and the model of the forces of the tires carefully, the motion of the state of the vehicle can be described as one deterministic part, which is entirely determined by the state of the vehicle, and one uncertain part, where the uncertain part is dependent on both the state of stiffness of the tires and the uncertainty of the measurements of the state of the vehicle. For example, the model of the motion of the vehicle can be described according to some nonlinear function $x_{k+1}=f(x_k, u_k)+g(x_k, u_k)w_k$, where $f \in \mathbb{R}^n$ is a nonlinear deterministic function describing the evolution of the state of the vehicle, $g \in \mathbb{R}^{n \times d}$ is a nonlinear deterministic function dependent on the state of the vehicle, mapping the disturbances $w_k \in \mathbb{R}^d$, k is the discrete time index, $x \in \mathbb{R}^n$ is the state, and $u_k$ contains the inputs to the system. The dynamic model of the motion of the vehicle depends on the state of stiffness, including mean of the stiffness, variance of the stiffness, and friction coefficient in each direction of each tire. In some embodiments, the disturbance $w_k \in \mathbb{R}^d$ affecting the motion of the vehicle is due to uncertainties in the numerical description of the tire stiffness. In other embodiments, the state of the vehicle includes a velocity vector and a heading rate of the vehicle.

Figure 5A:
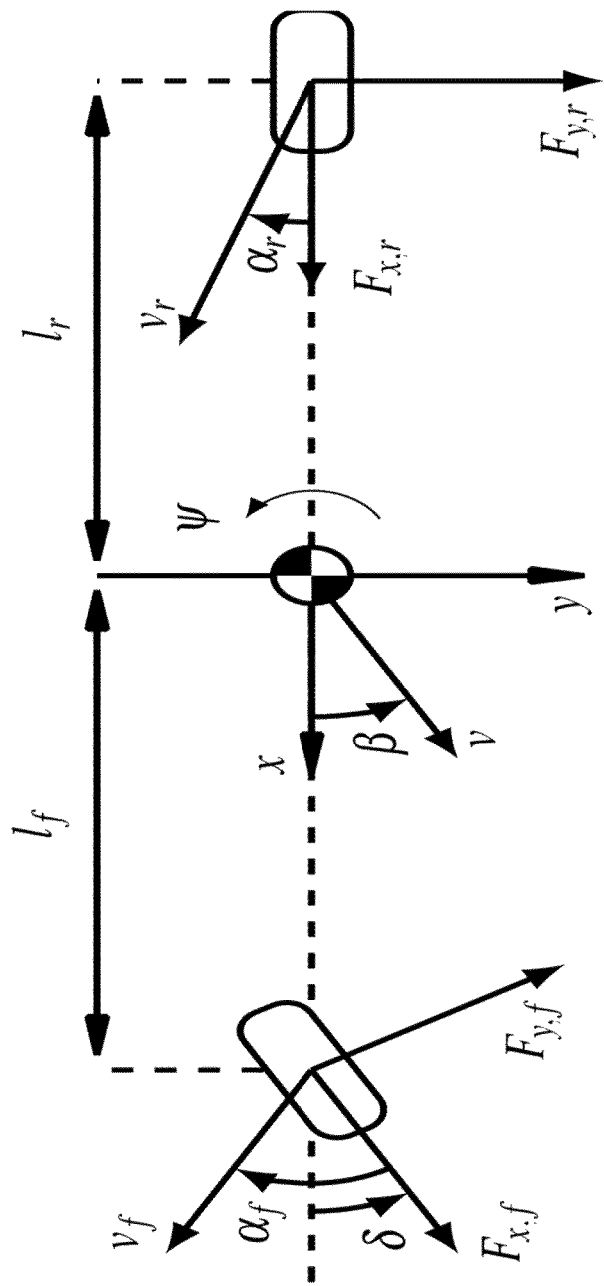
FIG. 5A is a schematic of a simplified vehicle model.
Figure 5B:
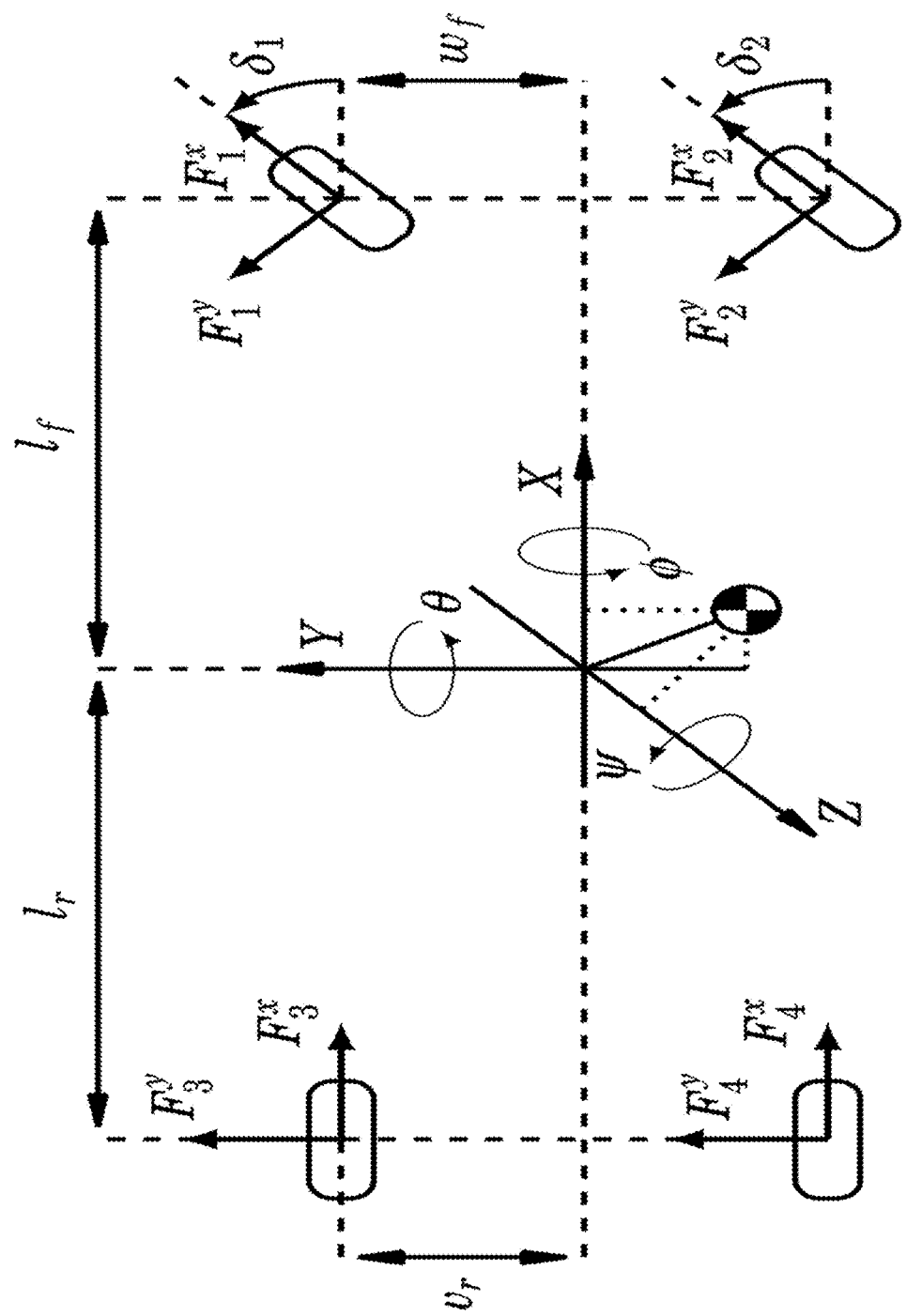
FIG. 5B is a schematic of a full-order vehicle model.

FIG. 5A shows a schematic of a simplified front-wheel drive single-track model of the vehicle, in which the two wheels on each axle are lumped together. This model depends on three stiffness parameters when accelerating, one longitudinal and two lateral. The state of stiffness can be written as $C^x \approx C_n^x + \Delta C^x$, $C^y \approx C_n^y + \Delta C^y$, where $C_n$ is the nominal value of the stiffness, for example, determined on a nominal surface, and $\Delta C$ is a time-varying, unknown part. One embodiment defines $w_k := [\Delta C_f^x \ \Delta C_f^y \ \Delta C_r^y]^T$ as random disturbance acting on the otherwise deterministic system. In some embodiments, the noise term is Gaussian distributed according to $w_k \sim N(\mu_k, \Sigma_k)$, where $\mu_k, \Sigma_k$ are, in general, time varying, mean and covariance of the state of stiffness. In FIG. 5A, $\delta$ is the steering angle of the front wheel, $\alpha$ is the slip angle in the lateral case, $\beta$ is the body slip of the vehicle, which is defined as the ratio of the forward and lateral velocity of the vehicle, and $F_{x,y}$ is the longitudinal (forward) and lateral force, respectively. FIG. 5B shows a schematics of a full chassis model with front steering. In such a case, the number of parameters to be estimated increases, but it is to be understood that the same method applies.

One embodiment of the invention chooses the inputs to the system as the wheel-speed estimates 221, averaged over each wheel axle. In another embodiment, the inputs are the wheel-speed estimates 221 in combination with the steering angle of the wheels 231, averaged over each wheel axle. In nonautonomous mode, sometimes the steering angle of the wheel cannot be measured, but the steering angle of the steering wheel can be measured. Yet another embodiment transforms the steering angle of the steering wheel to the steering angle of the wheels, by considering gear ratios of the mechanical construction connecting the steering wheel with the wheels.

In terms of a probability density function (PDF), with the definition $\theta_k := \{\mu_k, \Sigma_k\}$, the dynamical system can be described as $p(x_{k+1}|x_k, u_k, \theta_k)$. Some embodiments rely on the realization that determining the state of the vehicle and the state of stiffness of the tire can be done by determining the PDF of the total system, given sensing information. To determining the PDF of the system, several embodiments of the invention define the measurements to the system 231 from the sensing system 230 as corrupted by biased noise. For example, if one measurement is the heading rate $\dot{\psi}$, the measurement $\dot{\psi}_m$ is related to the heading rate according to $\dot{\psi}_m = \dot{\psi} + b_\psi + e$, where $b_\psi$ is an offset term because of drift in the sensor, and e is zero-mean noise corrupting the measurement. For example, the noise can be modeled as a Gaussian PDF, $e \sim \mathcal{N}(0, R)$, with variance R. The noise source accounts for that the measurement is not perfect. The noise source can be chosen in several ways. In one embodiment, the yaw rate and acceleration commands are combined to form a vector of measurements, at each time step, all with individual bias components. In some embodiments, the system is estimated by estimating iteratively the three PDFs $p(b_k|\theta_k, x_k, y_{0:k})p(\theta_k|x_k, y_{0:k})p(x_k|y_{0:k})$, whereby after estimating the said PDFs, the state of the vehicle and the state of stiffness of the tires can be reconstructed, and the surface can be classified. Some other embodiments represent the continuous PDFs using N discrete weights, which as N gets large enough, exactly represent the continuous PDFs. The PDF of the state of the vehicle is then represented by N hypotheses of the state of the vehicle, and the statistics of the other two PDFs can be represented using either approximate techniques or exact techniques. For example, the PDF of the tire parameters can be updated using sampling-based techniques or using Normal-inverse-Wishart update techniques. Similarly, the PDF of the bias terms can be updated using sampling-based techniques or using Kalman-filter representation, wherein the accuracy of the different representations depends on the particular model of the dynamical evolution and the particular modeling of the involved measurements.

Some embodiments acknowledge that the state of stiffness of the tires can be accurately estimated, by considering the state of stiffness, states of the vehicle, and bias terms of the measurements jointly. In one embodiment, the quantities are estimated by assigning probabilities to how likely the combination of the quantities explains the measurement vector.

FIG. 6A illustrates a scenario where the vehicle has an initial state 610. For one set of parameters of the tires and a given input to the system, the vehicle obeys the motion 611a and ends up in 630a, with resulting uncertainty 631a. The uncertainty of the sensing system 230 leads to that the state of the vehicle can only be known up to a certain area 620. However, the end state of the vehicle 630a well resides within the area 620, so this particular combination of state of stiffness, bias terms, and initial state of the vehicle, is given a high probability of being a good combination.

FIG. 6B shows a vehicle with the same initial state 610, possibly with the same bias terms of the sensors, but with another particular set of parameters of the tires. For the same inputs to the system, the vehicle 610 now obeys the motion 611b, leading to that the vehicle ends up in state 630b, with resulting uncertainty 631b. However, this end state 630b of the vehicle does not reside within the certainty area of the sensors. Thus, this particular combination of initial state, parameters of the tires, and bias terms, is assigned a low probability of being a good combination.

Figure 6C:
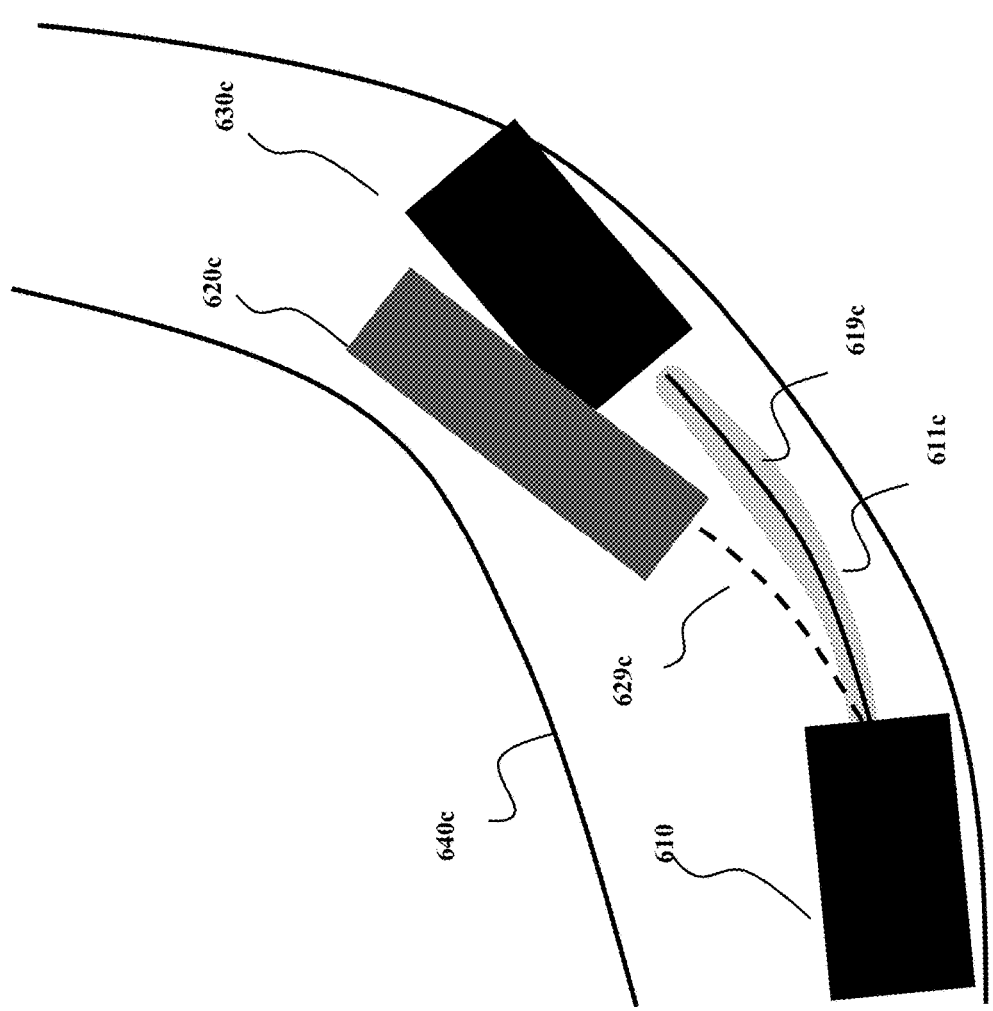
FIG. 6C is a schematic of different motions determined according to some principles employed by some embodiments of the invention.

FIG. 6C shows a schematic of different motions determined according to some principles employed by various embodiments of the invention. The vehicle is estimated to be at the current state 610 on a road with road boundaries 640c, where the estimates of the current state 610 has been determined during previous iterations according to other embodiments of the invention. The lines 619c and 629c are two different motions determined using two different states of the stiffness, leading to two possible states 620c and 630c of the vehicle. The gray area 611c indicates the uncertainty of the sensors from the sensing system 230, i.e., the possible area where the motion is likely to occur, determined from the a priori known noise modeling of the sensors. Only the motion 619c is inside the uncertainty region. Hence, the state 620c resulting from the motion 629c, and the state of stiffness associated with the motion 629c, are given a low probability of being a good combination.

Figure 6D:
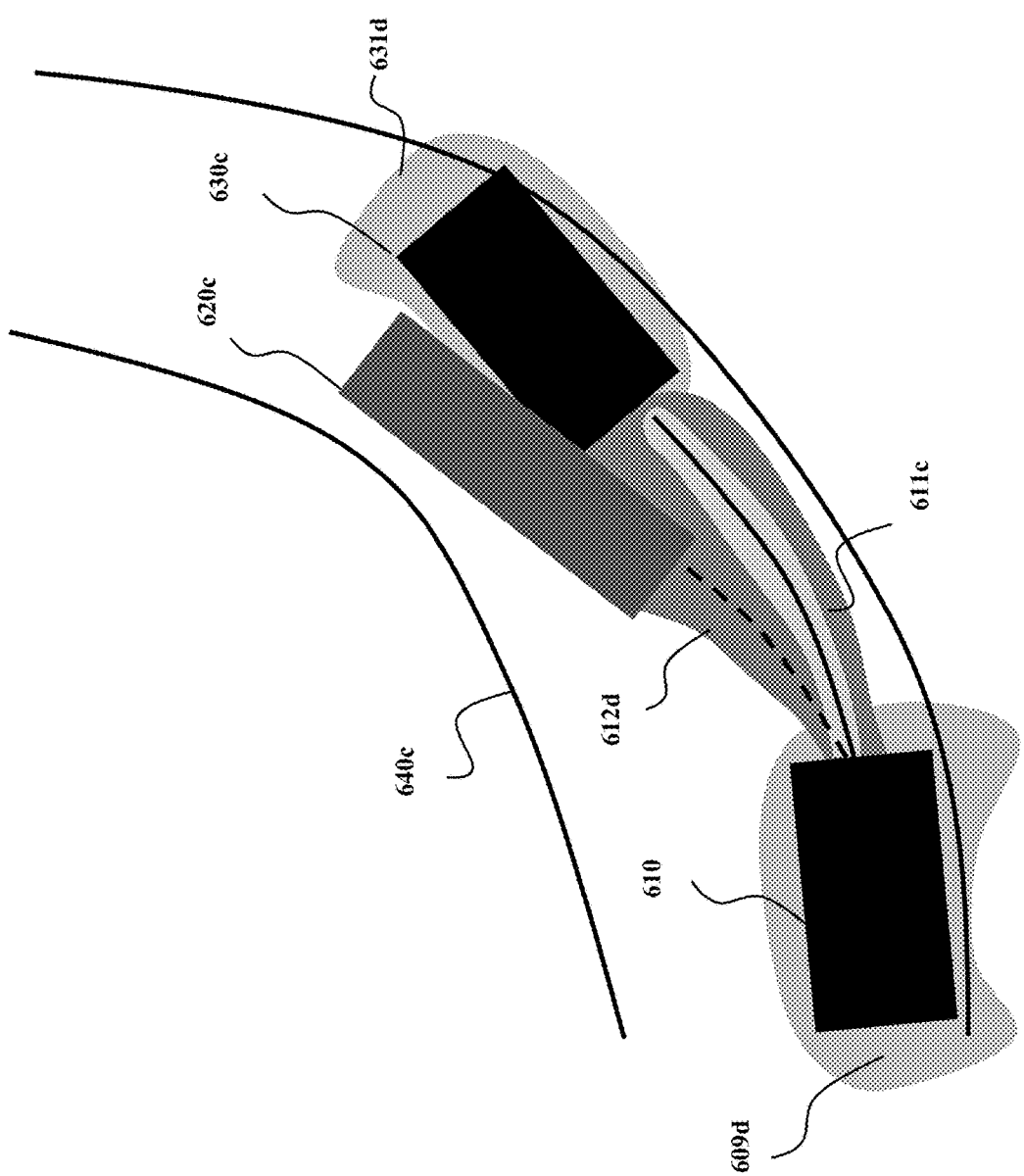
FIG. 6D is a schematic of different motions and associated probability distributions determined according to some principles employed by some embodiments of the invention.

As shown in FIG. 6D, the motion of the vehicle can be modeled in the form of a PDF 612d over the state of the vehicle, wherein the initial condition 609d of the PDF 612d has been determined during previous iterations. In some of the embodiments of the invention, the motion is computed by; first determining several motions from initial states to end states, where the different motions are initiated according to the set of parameters of the wheels or tires belonging to that particular motion; second, determining how the different motions agree with the true motion sensed by the sensing system 230; third, determining parameters that are consistent with the determining how the different motions agree with the true motion sensed by the sensing system. To illustrate, FIG. 6D shows a situation where two different motions lead up to states 620c and 630c, respectively, and the PDF 612d of the motion of the vehicle both agree with the respective motions. However, after determining how the different motions agree with the PDF 611c of the sensing system, the PDF 631d is achieved, which does not agree with the state 620c. In certain embodiments of the invention, the resulting PDF 631d forms the basis for another iteration of the method.

Some embodiments determine a probability of each particle to represent a true state of the stiffness based on a difference between the state of the vehicle estimated using the state of stiffness of the particle and the measured state. For example, one embodiment determines such a probability using the PDF of the state of the vehicle.

Figure 6F:
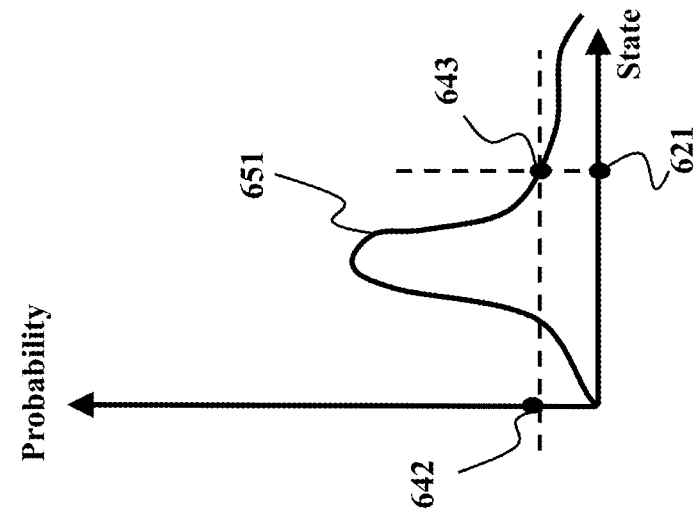
FIGS. 6E and 6F are graphs illustrating selection of the probability of the sampled parameters.
Figure 6E:
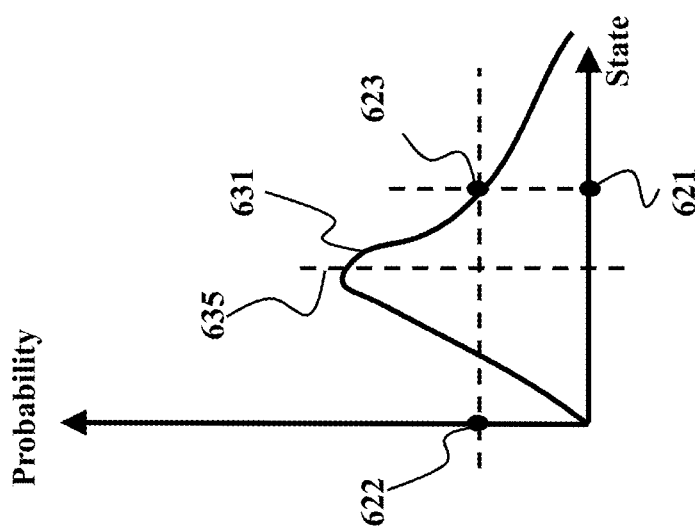

FIG. 6E shows a graph illustrating selection of the probability of the sampled parameters using the PDF 631 over possible states of the vehicle according to one embodiment of the invention. For example, the PDF 631 can be a probability distribution of the measurement model. The shape of such a probability distribution can be determined in advance, e.g., as a Gaussian or different shape, and the location of this probability distribution 631 is centered on the measured state 635. To that end, one embodiment determines a probability distribution of the state of the vehicle and/or the state of the stiffness using a probability distribution 631 of the measurement model centered on the measured state. To that end, the embodiment can determine the probability of each particle to represent the true state of the stiffness according to a placement of the mean in the particle on the probability distribution of the state of the vehicle and the state of the stiffness.

For example, the embodiment submits the initial state and one sample of the parameter values to the model of the motion of the vehicle to estimate a transition of the vehicle from the initial state to a next state 621 and selects a value 622 of the PDF over states of the vehicle at a point 623 corresponding to the next state 621 as the probability of the state of the vehicle and/or the state of the stiffness to be accurate.

FIG. 6F shows another graph illustrating selection of the probability of the sampled parameters according to PDF 651, which is different from the PDF 631 of FIG. 6E. For example, the PDF 651 is the distribution updated based on a change of the measured state. In this example, the embodiment selects a value 622 of the PDF 651 over states of the vehicle at a point 643 corresponding to the next state 621 as the probability of the state of the vehicle and/or the state of the stiffness.

Figure 7A:
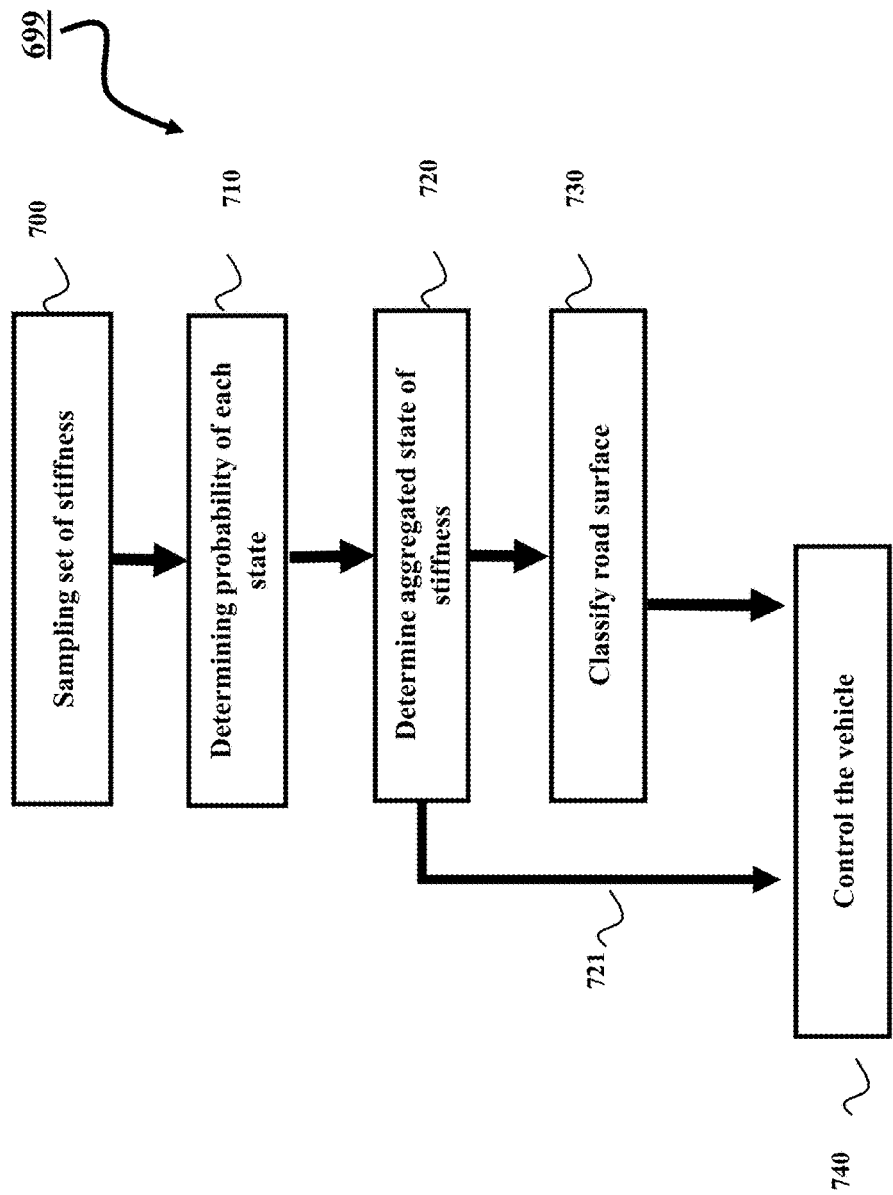
FIG. 7A is a flowchart of one iteration of a method for estimating the state of stiffness and state of the vehicle, and for controlling the vehicle according to some embodiments of the invention.

FIG. 7A shows a flowchart of one iteration of a method 699 for estimating the state of stiffness and state of the vehicle, and to control the vehicle according to some embodiments of the invention. The method determines a set of parameter values and associated uncertainties, specifying the model of the vehicle, and state of the vehicle that explains the motion of the vehicle, starting from an initial state and an initial set of parameters. In different embodiments, the initial state of the vehicle is a current estimated state of the vehicle and/or wherein the initial state of the vehicle is the state of the vehicle corresponding to the state of stiffness determined during a previous iteration of the method.

The motion is defined by the state transitions connecting states of the vehicle, for example, as shown in FIG. 6A for a motion connecting two estimated states of the vehicle. Each state includes at least a velocity and a heading rate of the vehicle. Steps of the method are performed by a processor 270 of the estimator 240 and/or of the vehicle. The motion is determined iteratively until a termination condition is met, for example, for a time period or for a predetermined number of iterations. An iteration of the method of FIG. 7A includes the following steps.

The method 699 determines 700 a set of sampled states of stiffness and a corresponding set of transitions to a set of states satisfying static and dynamic constraints on the state of the vehicle. For example, the method determines the state transitions 619c, 629c, and the states 630c, 620c, in FIG. 6C. Next, the method 699 determines 710 the probability of each state of stiffness sample in the step 700 to produce movement to a state consistent with the measurements of the motion of the vehicle.

Using the probability of each state as the probability of the particle of the state of stiffness used to estimate those state, the method 699 determines 720 the aggregated state of stiffness 721 according to the function that uses a weighted combination of the updated mean and the updated variance in each particle. For example, the weights in the combination are determined by the probability of each particle to represent the true state of the stiffness. Additionally or alternatively, the function can just select the state of stiffness of the most likely particle. Other embodiments use different function for determining the state of stiffness 721, which can be used to control 740 the vehicle and/or the classify 730 the surface of the road.

Figure 7B:
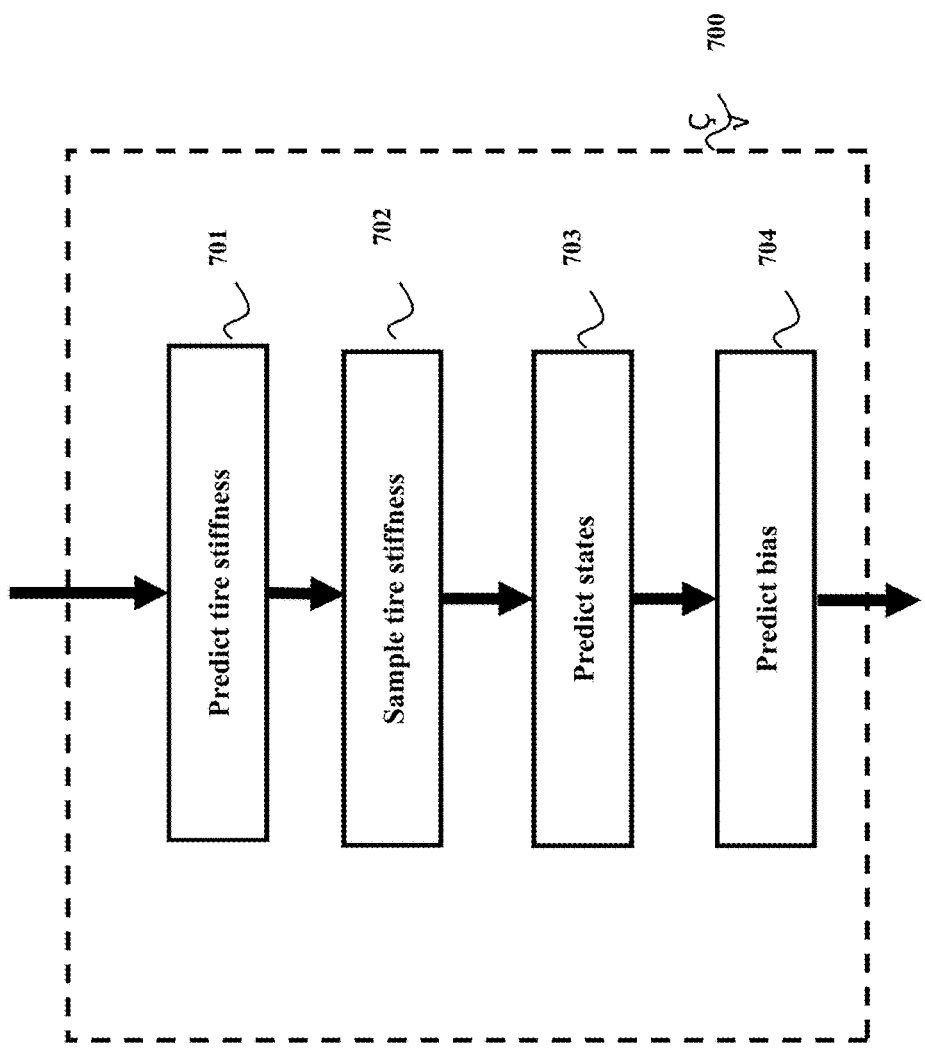
FIG. 7B is a flowchart of an exemplar implementation of the determining the set of states of stiffness of the method of FIG. 7A according to one embodiment of the invention.

FIG. 7B shows a flowchart of an exemplar implementation of the determining 700 the set of states of stiffness values according to one embodiment of the invention. The determining 700 uses the actual inputs to the system and initial states estimated using previous iterations. The method first predicts 701 N means and variance for the set of particles $\{\mu_k^i, \Sigma_k^i\}_{i=1}^{N}$ from values determined during previous iterations. Then, the method samples 701 a set of N values of the state of stiffness, where N can be predetermined or made adaptive, and predicts 703 the states $\{x_k^i\}_{i=1}^N$ using the set of values of the state of stiffness. Then, the determining 700 predicts 704 the bias terms, i.e., the variance, that accounts for additional errors in the sensing or model that has not been accounted for yet.

In some embodiments of the invention, each value number i of the state of stiffness is generated using number i of $\{\mu_k^i, \Sigma_k^i\}_{i=1}^N$, which is a set of noise-source parameters of the dynamical system, i.e., from $w_k$, where $\mu_k^i$ denotes the estimated mean of the tire stiffness and $\Sigma_k^i$ the corresponding uncertainty, or variance. For example, $w_k$ can be chosen as arising from a Gaussian distribution $w_k \sim \mathcal{N}(\mu_k, \Sigma_k)$, or can be chosen as a PDF tailored to the particular application. In some embodiments, to account for the uncertainty in the stiffness estimates themselves, a student-t distribution is used, which approaches the Gaussian for each iteration.

In some embodiments of the invention, the sampled parameter values 702 are generated by inverting the dynamical system. In such a case, in one embodiment, the states $\{x_k^i\}_{i=1}^N$ are instead generated by using a probabilistic function $q(x_k|x_k-1, y_k)$, and the sampled stiffness values are generated by inverting of the dynamical system to better satisfy the measurements. However, inverting the system model cannot always be done exactly.

Figure 7C:
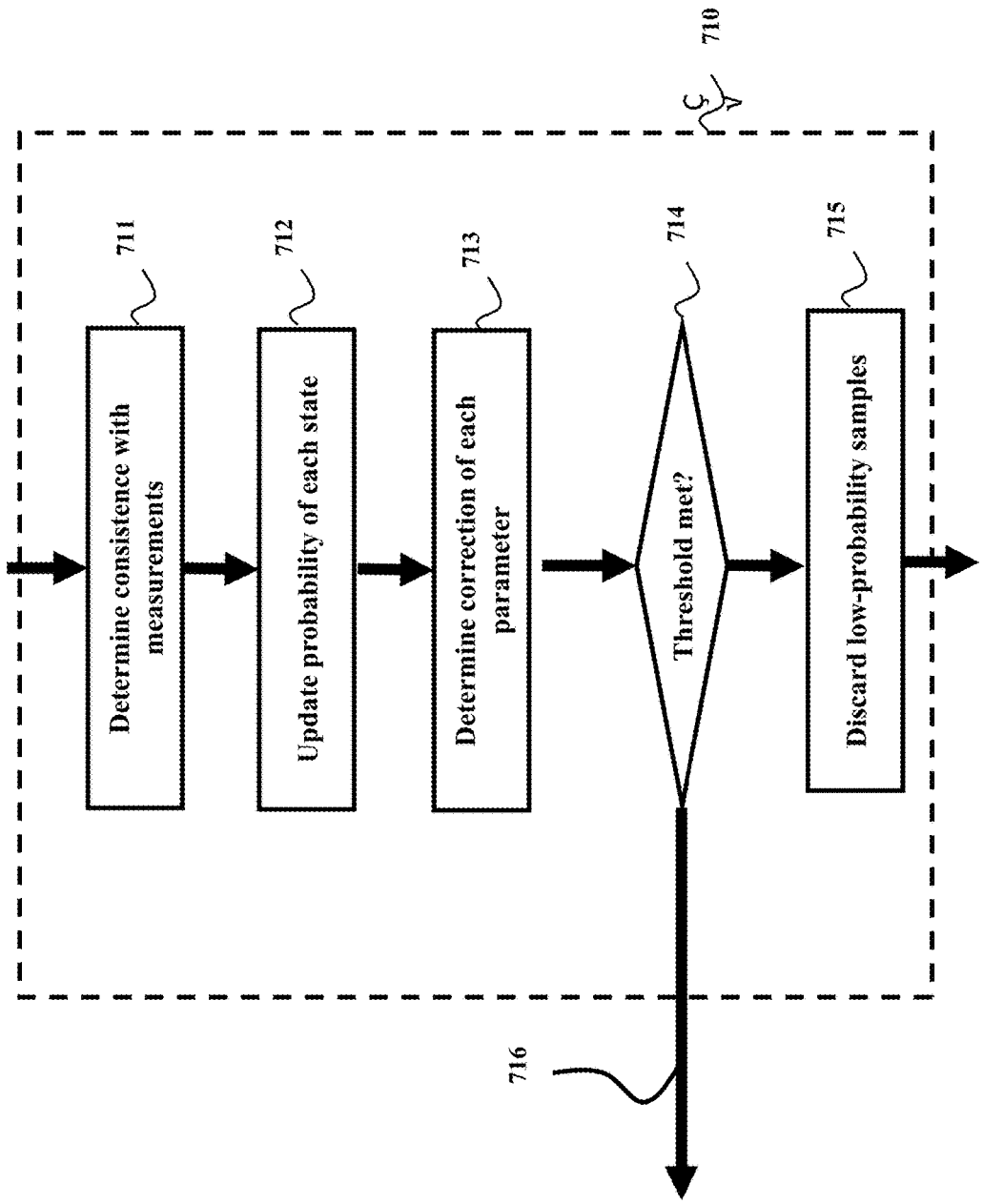
FIG. 7C is a flowchart of an exemplar implementation of the determining the probability of each sampled state of stiffness of the method of FIG. 7A according to one embodiment of the invention.

FIG. 7C shows a flowchart of the method 710 that determines the probability of each sampled state of stiffness producing movement to a state consistent with the measurements of the motion of the vehicle. When determining the probability of each stiffness value, the consistence of the next state 702 with the measurement is determined 711 and the probability of each state is computed 712. For example, one embodiment determines the probability 712 using principles described in FIGS. 6E and 6F.

In one embodiment of the method 710, if the so-called effective sample size is below a threshold 714, where the threshold can be predetermined, few stiffness values have a large probability of leading to a state consistent with the measurements of the motion of the vehicle, so the method duplicates samples and corresponding states with high probability and discards those with low probability 715. Otherwise, the method exits 716. Additionally or alternatively, in some embodiments, stiffness values and corresponding states with nonzero but low probability are replaced with inputs and states with higher probabilities. For example, one embodiment generates a new set of stiffness values and corresponding states in such a way that the probability of generating $x_k^i$ is at least $q_k^i$. In another embodiment, the replacement is performed whenever the inverse square sum of the probabilities is below some predefined threshold. Doing in such a manner ensures that only probably good stiffness values are used.

In some embodiments of the invention, the determining 712 is done as a combination of the PDF of the measurements, $p(y_k|x_k^i, y_{0:k}-1)$, the PDF of the dynamical system, and the probability $q_k-1^i$ of the input determined during previous iterations of the method 700. For example, if stiffness values are generated according to the uncertainty model of the parameters, the probabilities are proportional to the PDF of the measurements, i.e., $q_k^i \propto q_k-1^i p(y_k|x_k^i, y_{0:k}-1)$. In one embodiment, the probabilities are normalized in such a way that they represent a PDF. Relating to FIG. 6F if $q_{k-1}^i$ is given by the value 642 at a point 643 on the PDF 651 determined during previous iterations corresponding to the state 621, the updated probability $q_k^i$ is determined as a multiplication of 622 and 642.

The determining 713 of the tire parameters $\{\mu_k^i, \Sigma_k^i\}_{i=1}^N$ can be done in several ways. For example, one embodiment determines corrected parameters by using the sampled stiffness value $\overline{w}_k$ to correct each parameter set using the correction module $$\gamma_{k|k} = \frac{\gamma_{k|k-1}}{1+\gamma_{k|k-1}},$$

$$\hat{\mu}_{k|k} = \hat{\mu}_{k|k-1} + \gamma_{k|k} z_k,$$

$$\nu_{k|k} = \nu_{k|k-1} + 1,$$

$$\Lambda_{k|k} = \Lambda_{k|k-1} + \frac{1}{1+\gamma_{k|k-1}} z_k z_k^T,$$

$$z_k = \overline{w}_k - \hat{\mu}_{k|k-1}.$$

Here, parameters are corrected from the predicted parameters of the tire. From the above equations, we can deduct the value of the tire stiffness directly, the uncertainty of the tire stiffness can be determined from the equations above.

The determining 720 of the state of stiffness of the wheels or tires and corresponding state of the vehicle can be done in several ways. For example, one embodiment determines the state of stiffness by using a weighted average function $$\hat{\mu}_k = \sum_{i=1}^N q_k^i \hat{\mu}_{k|k}^i$$

to produce the tire stiffness value as
the certainty of the parameter values as
and similar for the state of the vehicle. Another embodiment determines the said $$\hat{\sum}_k = \sum_{i=1}^N q_k^i \left( \frac{1}{\nu_{k|k} - n - 1} \Lambda_{k|k}^i + (\hat{\mu}_{k|k}^i - \hat{\mu}_k)(\hat{\mu}_{k|k}^i - \hat{\mu}_k)^T \right)$$

quantities as the state and parameters with highest probability.

Figure 7D:
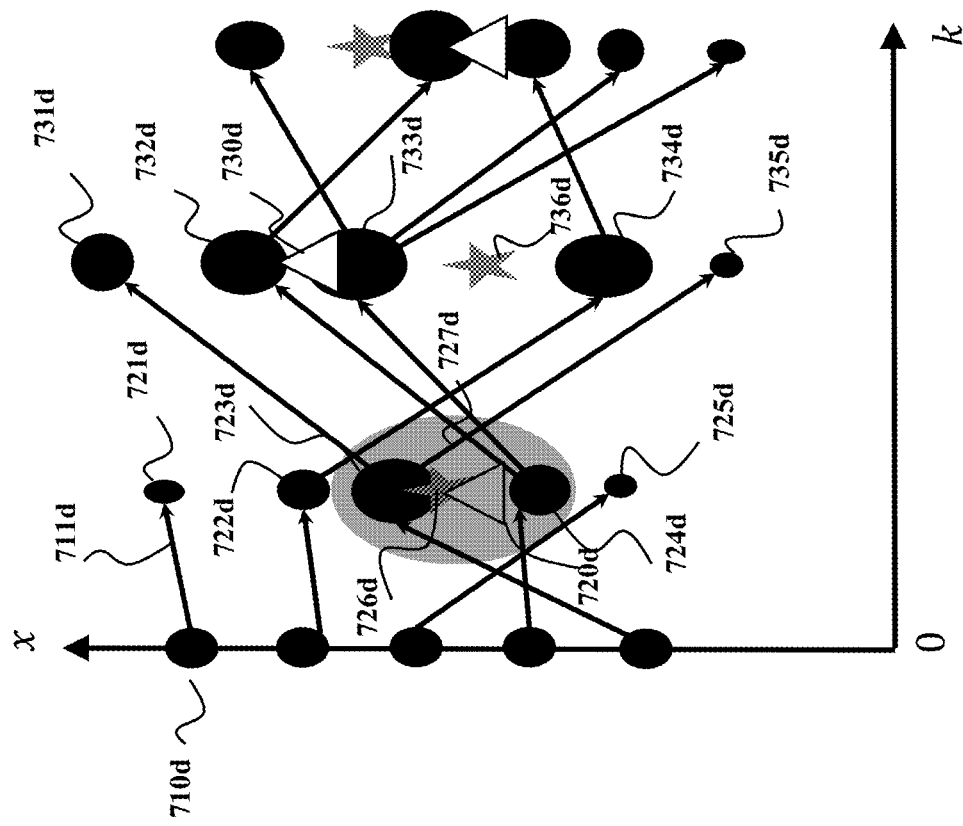
FIG. 7D is a simplified schematic of the result of three iterations of some steps of the method of FIG. 7A according to one embodiment of the invention.

FIG. 7D shows a simplified schematic of the result of three iterations of steps 700, 710, and 720 when five sampled stiffness values are generated for each iteration. The initial state 710d is predicted forward in time 711d using the model of the motion and the inputs to the system and the five sampled stiffness values, used to parameterize the dynamic model, to produce five next states 721d, 722d, 723d, 724d, and 725d. The probabilities are determined as a function of the measurement 726d and the model of the noise source and the bias 727d of the measurement 726d. At each time step, i.e., at each iteration, an aggregate of the probabilities is used to produce an aggregated set of tire parameters and corresponding state 720d.

Figure 7E:
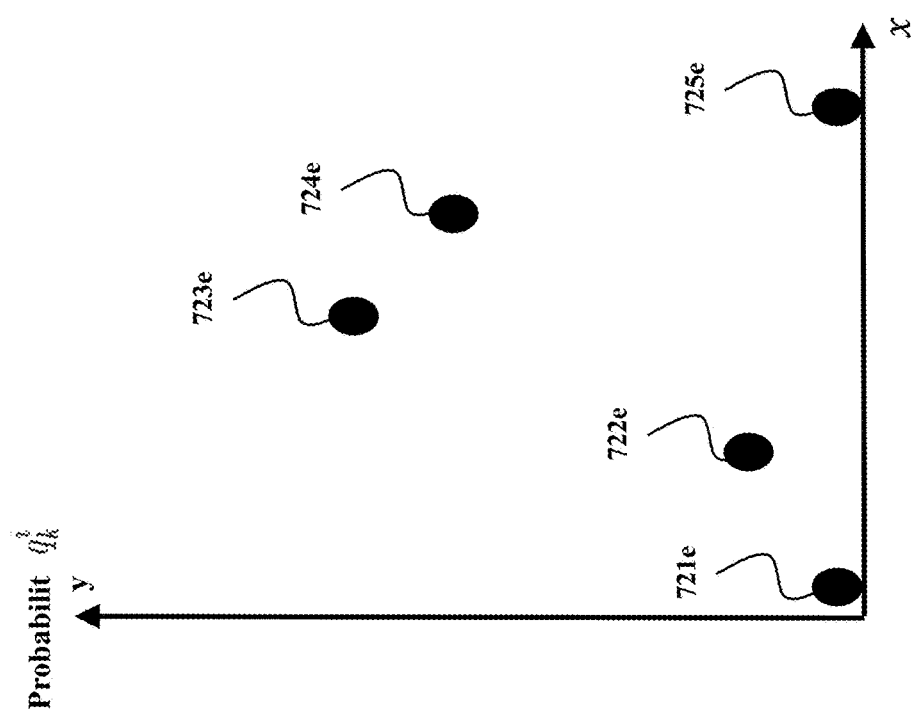
FIG. 7E is a schematic of the determining the probabilities of the states and corresponding tire parameters, and corresponding aggregates according to some principles employed by some embodiments of the invention.

FIG. 7E shows possible assigned probabilities of the five states at the first iteration in FIG. 7D. Those probabilities 721e, 722e, 723e, 724e, and 725e are reflected in selecting the sizes of the dots illustrating the states 721d, 722d, 723d, 724d, and 725d.

Referring back to FIG. 7D, the state 720d, together with the associated tire parameters are used as output 721 in FIG. 7A for control 740 of the vehicle. Referring back to FIG. 7C, if the threshold 714 is met, high-probability states and corresponding parameters and bias terms are duplicated and become the initial states for the next iteration that again produces five sampled stiffness values transitioning the state of the vehicle from the initial state 721d, 722d, 723d, and 724d to next states 731d, 732d, 733d, 734d, and 735d. The control input corresponding to the state 730d is selected according to the probabilities of the sampled control inputs of this iteration. The states 732d, 733d, and 734d are the initial states for the next iteration in this particular example, but in general, all states could be expanded forward in time.

Figure 7F:
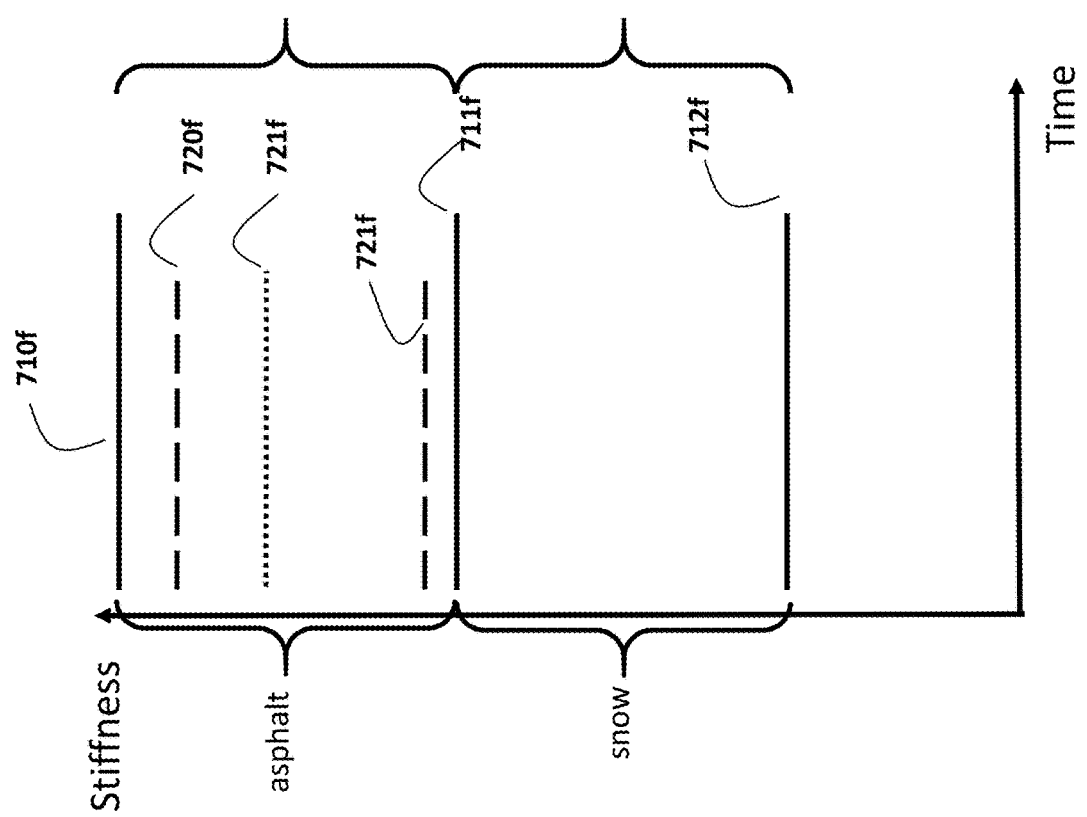
FIG. 7F is a schematic of the determining the road surface classification and friction parameter.

FIG. 7F shows a schematic of a method for classifying 730 the road surface according to one embodiment that uses a database with tabulated values of the relation between road surface and the values of the state of stiffness. For example, the database can be stored in the memory 280 shown in FIG. 2B. For example, the maximum value 710f and minimum value 711f of the value of the tire stiffness for asphalt are stored in the database. In FIG. 7F, there are only two surface conditions present and one value represents the stiffness but it is to be understood that the reasoning can be extended to any number of surface conditions, with different representations of the surface conditions, and with several stiffness values. The line 711f also determines the boundary between asphalt and snow, and the minimum value of snow is 712f, i.e., the minimum value that can occur on snow surfaces. The estimated value 721f of the state of stiffness, i.e., the mean of the state of stiffness, and the uncertainty of this value 720f, i.e., the variance of the state of stiffness indicated by lines 720f and 721f, are within the range of 710f and 711f, so the surface can be classified as asphalt.

Some embodiments control 740 the vehicle according to the state of stiffness, computed by the estimator 240. The control 740 depends on the value of the state of stiffness. In one embodiment, the uncertainty of the state of stiffness is used to determine how much the vehicle control should intervene. For example, the uncertainty is used in a controller that makes sure that the vehicle is accurately controlled for all tire parameters in the range of uncertainties. If the controller decides that the vehicle cannot be sufficiently maneuvered, in one embodiment the controller gracefully stops the vehicle by invoking braking control and possibly steering control. In another embodiment, the controller alerts the driver that vehicle stability cannot be guaranteed.

Figure 8:
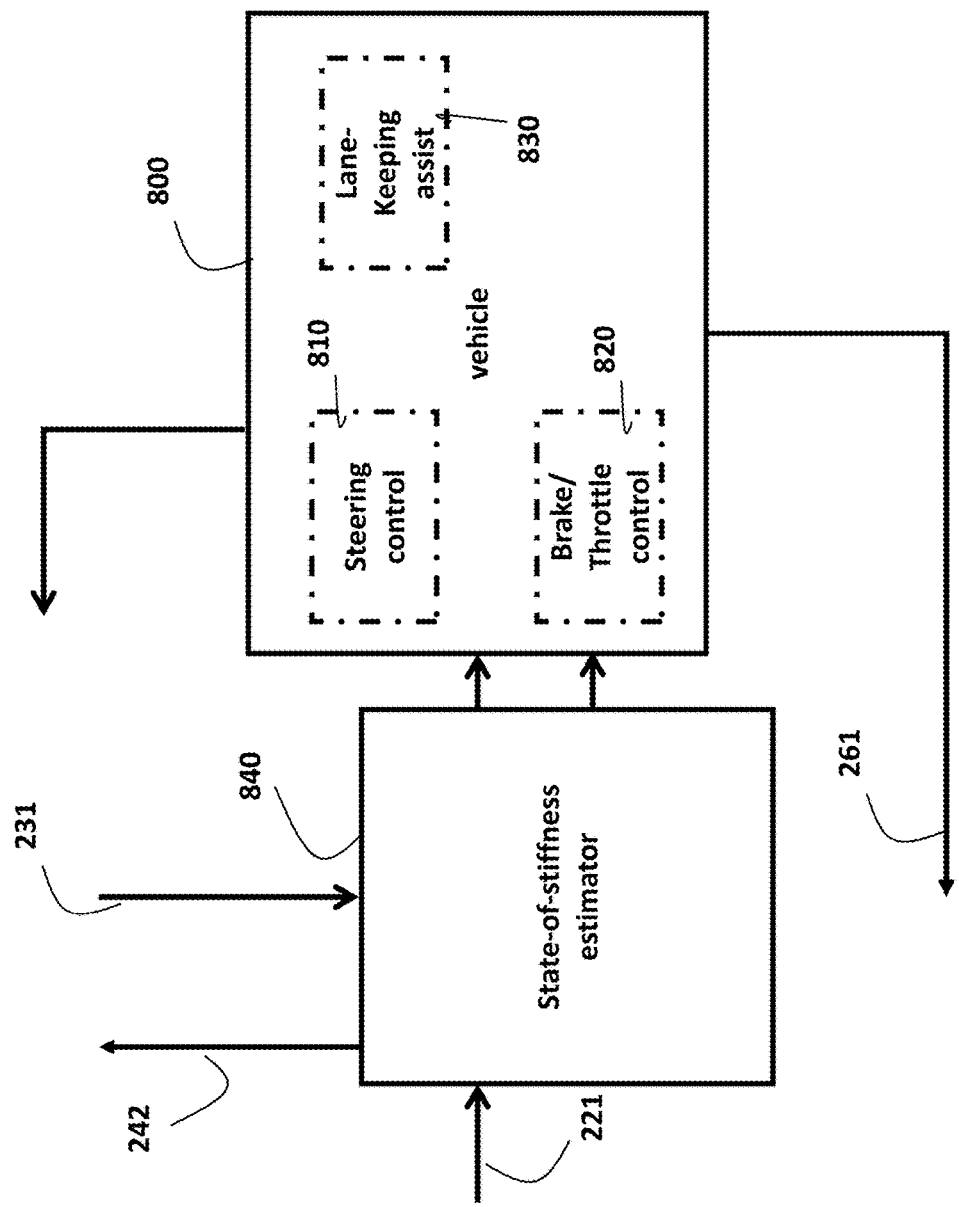
FIG. 8 is a schematic of interaction between the state-of-stiffness estimator and vehicle controllers according to some embodiments of the invention.

FIG. 8 shows a schematic of interaction between the control system and the vehicle controllers according to some embodiments of the invention. For example, in some embodiments of the invention, the controllers of the vehicle 800 are steering 810 and brake/throttle controllers 820 that control rotation and acceleration of the vehicle 800. In such a case, the state-of-stiffness estimator 840 outputs both longitudinal and lateral stiffness and/or friction estimates. However, in one embodiment a lane-keeping assist 830 is used, such that the estimation system outputs only lateral components. In both cases, a vehicle controller 800 maps the parameters to a vehicle model used by at least one controller of the vehicle controlling at least one actuator of the vehicle, such as the steering wheel and/or the brakes of the vehicle, and controls the motion of the vehicle using the control command to the actuator of the vehicle. In another embodiment, the road classifier outputs 242 indication of the friction to a display visible to the driver. In such a case, if the vehicle is a semi-autonomous vehicle, the driver can decide if to intervene with the autonomous drive or to maintain autonomous driving mode.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a state of stiffness of tires of a vehicle by jointly estimating a state of a vehicle and the state of stiffness of tires of the vehicle, wherein the state of the vehicle includes a velocity and a heading rate of the vehicle, and wherein the state of stiffness includes at least one parameter defining an interaction of at least one tire of the vehicle with a road on which the vehicle is traveling, wherein the method uses a processor coupled with stored instructions implementing the method, wherein the instructions, when executed by the processor, carry out steps of the method, comprising:

retrieving from a memory a motion model of the vehicle and a measurement model of the vehicle, wherein the motion model of the vehicle includes a combination of a deterministic component of the motion and a probabilistic component of the motion, wherein the deterministic component of the motion is independent from the state of stiffness and defines the motion of the vehicle as a function of time, wherein the probabilistic component of the motion includes the state of stiffness having an uncertainty and defines disturbance on the motion of the vehicle, wherein the measurement model of the vehicle includes a combination of a deterministic component of the measurement model independent from the state of stiffness and a probabilistic component of the measurement model that includes the state of stiffness;

representing the state of stiffness with a set of particles, each particle includes a mean and a variance of the state of stiffness defining a feasible space of the parameters of the state of stiffness;

updating iteratively the mean and the variance of at least some particles using a difference between an estimated state of stiffness estimated using the motion model of the vehicle including the state of stiffness with parameters sampled on the feasible space of the particle and the measured state of stiffness determined according to the measurement model using measurements of the state of the vehicle; and controlling a display device to output a mean and a variance of the state of stiffness determined as a function of the updated mean and the updated variance in at least one particle.

2. The method of claim 1, wherein an iteration for updating the particle comprises:

sampling the feasible space of the particle to produce a sampled parameter;

estimating a state of the vehicle at an instant of time using inputs to the vehicle and a model of a motion of the vehicle including the sampled parameter;

measuring the state of the vehicle at the instant of time;

determining the mean of the measured state of stiffness that results in the measured state of the vehicle according to the measurement model;

determining the variance of the measured state of stiffness as a combination of an uncertainty of the measurements and the variance of the state of stiffness in the particle;

updating the mean of the state of stiffness in the particle using the mean of the measured state of stiffness; and updating the variance of the state of stiffness in the particle using the variance of the measured state of stiffness.

3. The method of claim 2, wherein, for updating the set of particles, the variance of the measured state of stiffness is determined as the combination of the uncertainty of the measurements and a set of variances of the state of stiffness in the set of particles.

4. The method of claim 1, further comprising:

determining a probability of each particle to represent a true state of the stiffness based on a difference between the state estimated using the state of stiffness of the particle and the measured state; and determining the state of stiffness according to the function that uses a weighted combination of the updated mean and the updated variance in each particle, wherein the weights in the combination are determined by the probability of each particle to represent the true state of the stiffness.

5. The method of claim 4, further comprising:

determining a probability distribution of the state of the vehicle and the state of the stiffness using a probability distribution of the measurement model centered on the measured state; and determining the probability of each particle to represent the true state of the stiffness according to a placement of the mean in the particle on the probability distribution of the state of the vehicle and the state of the stiffness.

6. The method of claim 1, further comprising:

classifying the surface of the road using the outputted mean and variance of the state of stiffness.

7. The method of claim 1, wherein the classifying comprises:

determining a type of the surface based on a value of the mean of the state of stiffness unless the variance of the state of stiffness covers a value corresponding to a different type of the surface.

8. The method of claim 1, wherein the classifying comprises:

determining a type of the surface based on a value of the mean of the state of stiffness; and determining a probability of the surface to have the type based on the variance of the state of stiffness.

9. The method of claim 1, wherein the parameter of the state of stiffness includes one or combination of a longitudinal stiffness of the tire, a lateral stiffness of the tire, a friction between the tire and the road.

10. The method of claim 1, further comprising:

controlling the vehicle based on the state of the stiffness of the tires.

11. A system for determining a state of stiffness of tires of a vehicle by jointly estimating a state of a vehicle and the state of stiffness of tires of the vehicle, wherein the state of the vehicle includes a velocity and a heading rate of the vehicle, and wherein the state of stiffness includes at least one parameter defining an interaction of at least one tire of the vehicle with a road on which the vehicle is traveling, wherein the parameter of the state of stiffness includes one or combination of a longitudinal stiffness of the tire, a lateral stiffness of the tire, a friction between the tire and the road, the system comprising:

a memory to store a motion model of the vehicle and a measurement model of the vehicle, wherein the motion model of the vehicle includes a combination of a deterministic component of the motion and a probabilistic component of the motion, wherein the deterministic component of the motion is independent from the state of stiffness and defines the motion of the vehicle as a function of time, wherein the probabilistic component of the motion includes the state of stiffness having an uncertainty and defines disturbance on the motion of the vehicle, wherein the measurement model of the vehicle includes a combination of a deterministic component of the measurement model independent from the state of stiffness and a probabilistic component of the measurement model that includes the state of stiffness;

an input interface to accept measurements of the state of the vehicle measured by at least one sensor; and a processor operatively connected to the memory and to the sensor, wherein the processor is configured to represent the state of stiffness with a set of particles, each particle includes a mean and a variance of the state of stiffness defining a feasible space of the parameters of the state of stiffness;

update iteratively the mean and the variance of at least some particles using a difference between an estimated state of stiffness estimated using the motion model of the vehicle including the state of stiffness with parameters sampled on the feasible space of the particle and the measured state of stiffness determined according to the measurement model using measurements of the state of the vehicle; and control a display device to output a mean and a variance of the state of stiffness determined as a function of the updated mean and the updated variance in at least one particle.

12. The system of claim 11, wherein the processor updates the particle iteratively, and wherein for an iteration of updating the particle, the processor is configured to sample the feasible space of the particle to produce a sampled parameter;

estimate a state of the vehicle at an instant of time using inputs to the vehicle and a model of a motion of the vehicle including the sampled parameter;

acquire from the sensor the measurement of the state of the vehicle at the instant of time;

determine the mean of the measured state of stiffness that results in the measured state of the vehicle according to the measurement model;

determine the variance of the measured state of stiffness as a combination of an uncertainty of the measurements and the variance of the state of stiffness in the particle;

update the mean of the state of stiffness in the particle using the mean of the measured state of stiffness; and update the variance of the state of stiffness in the particle using the variance of the measured state of stiffness.

13. The system of claim 12, wherein, the processor determines the variance of the measured state of stiffness as the combination of the uncertainty of the measurements and a set of variances of the state of stiffness in the set of particles.

14. The system of claim 11, wherein the processor determines a probability of each particle to represent a true state of the stiffness based on a difference between the state estimated using the state of stiffness of the particle and the measured state; and determines the state of stiffness according to the function that uses a weighted combination of the updated mean and the updated variance in each particle, wherein the weights in the combination are determined by the probability of each particle to represent the true state of the stiffness.

15. The system of claim 14, wherein the processor determines a probability distribution of the state of the vehicle and the state of the stiffness using a probability distribution of the measurement model centered on the measured state; and determines the probability of each particle to represent the true state of the stiffness according to a placement of the mean in the particle on the probability distribution of the state of the vehicle and the state of the stiffness.

16. The system of claim 11, wherein the processor is configured to classify the surface of the road using the outputted mean and variance of the state of stiffness.

17. The system of claim 16, wherein the processor determines a type of the surface based on a value of the mean of the state of stiffness; and determines a probability of the surface to have the type based on the variance of the state of stiffness.

18. The system of claim 11, further comprising:

a controller for controlling the vehicle based on the state of the stiffness of the tires.

19. The system of claim 11, further comprising:

a display for displaying the state of the stiffness of the tires.

20. A non-transitory computer readable memory embodied thereon a program executable by a processor for performing a method for jointly estimating a state of a vehicle and a state of stiffness of tires of the vehicle, wherein the state of the vehicle includes a velocity and a heading rate of the vehicle, and wherein the state of stiffness includes at least one parameter defining an interaction of at least one tire of the vehicle with a road on which the vehicle is traveling, the method comprising:

retrieving a motion model of the vehicle and a measurement model of the vehicle, wherein the motion model of the vehicle includes a combination of a deterministic component of the motion and a probabilistic component of the motion, wherein the deterministic component of the motion is independent from the state of stiffness and defines the motion of the vehicle as a function of time, wherein the probabilistic component of the motion includes the state of stiffness having an uncertainty and defines disturbance on the motion of the vehicle, wherein the measurement model of the vehicle includes a combination of a deterministic component of the measurement model independent from the state of stiffness and a probabilistic component of the measurement model that includes the state of stiffness;

representing the state of stiffness with a set of particles, each particle includes a mean and a variance of the state of stiffness defining a feasible space of the parameters of the state of stiffness;

updating iteratively the mean and the variance of at least some particles using a difference between an estimated state of stiffness estimated using the motion model of the vehicle including the state of stiffness with parameters sampled on the feasible space of the particle and the measured state of stiffness determined according to the measurement model using measurements of the state of the vehicle; and controlling a display device for outputting a mean and a variance of the state of stiffness determined as a function of the updated mean and the updated variance in at least one particle.

* * * * *